April 2, 1935. A. E. BLASHILL 1,996,061
MACHINE FOR FORMING WIRE FABRIC
Filed June 18, 1931 29 Sheets-Sheet 1
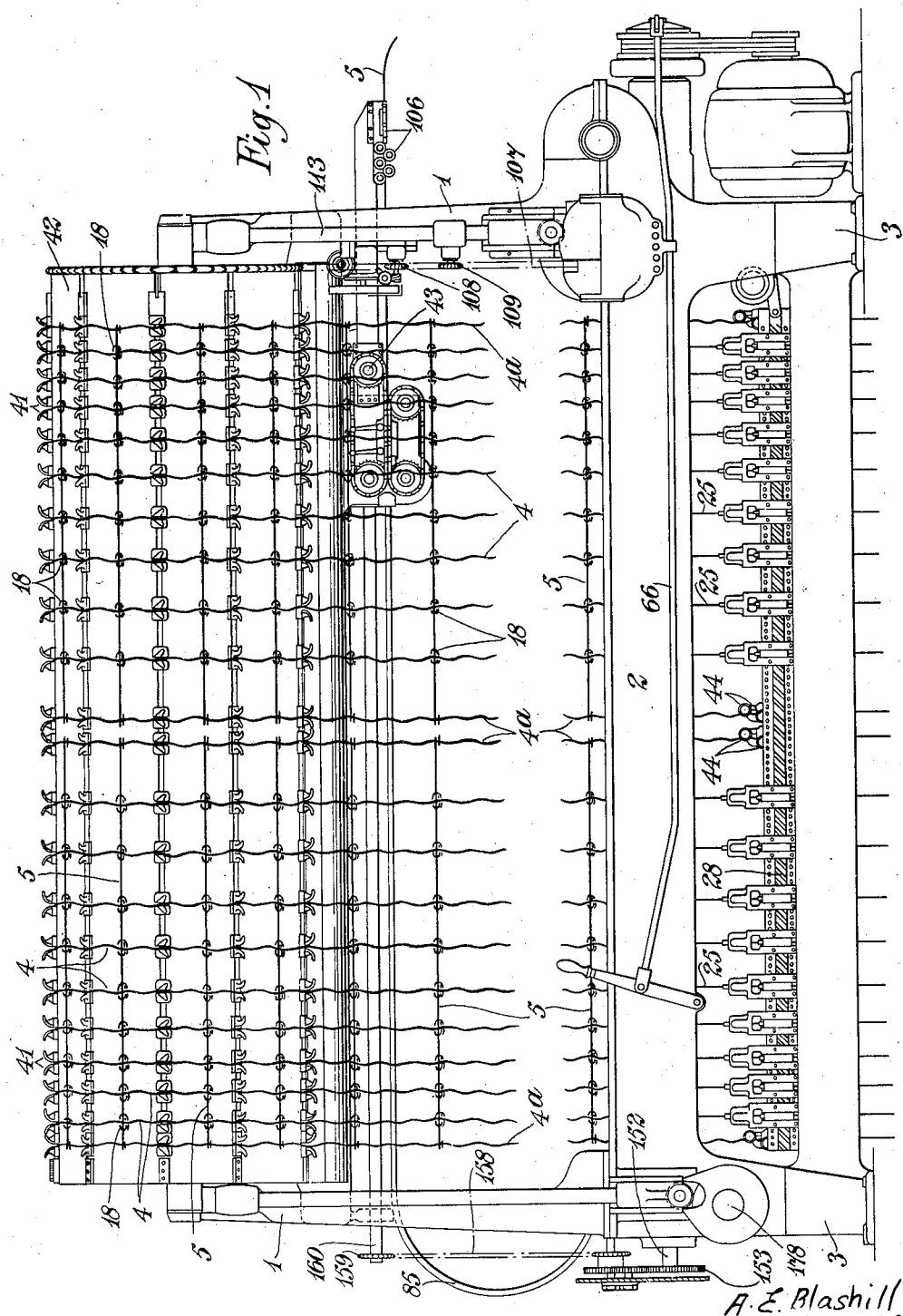

April 2, 1935.  A. E. BLASHILL  1,996,061
MACHINE FOR FORMING WIRE FABRIC
Filed June 18, 1931    29 Sheets-Sheet 2
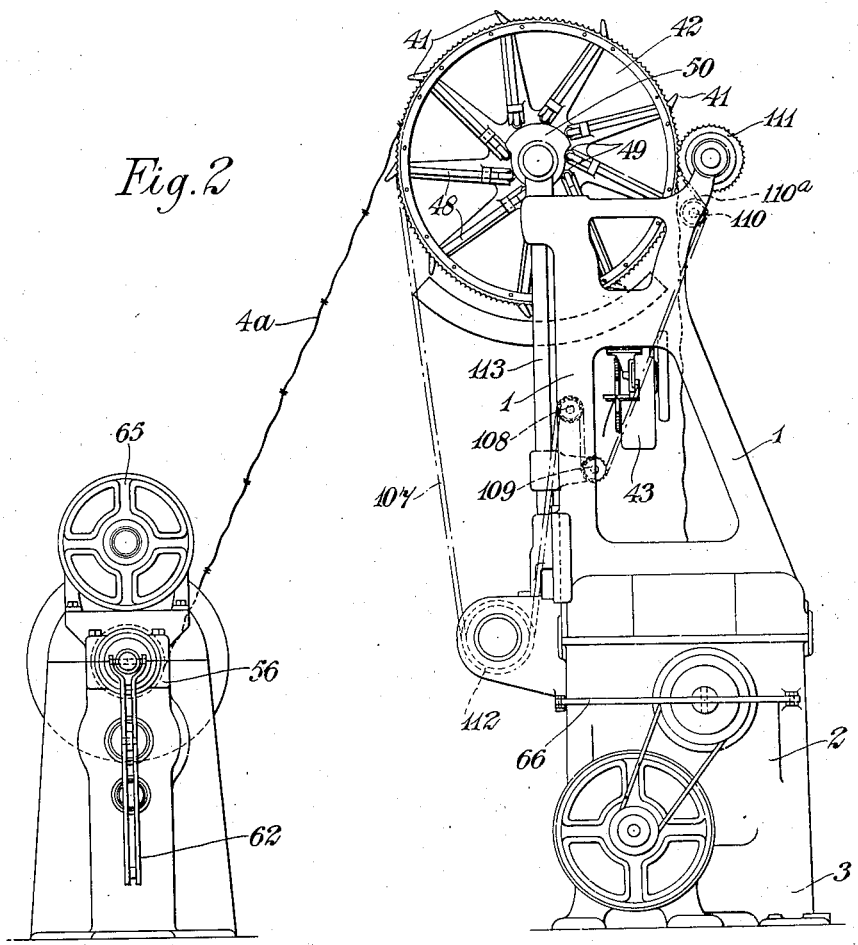
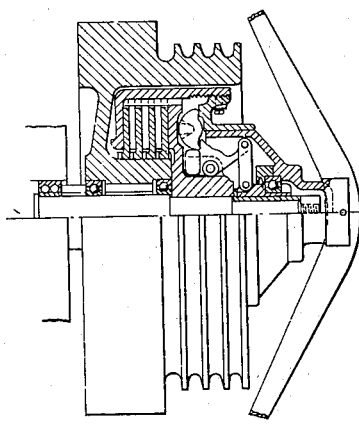
A. E. Blashill
INVENTOR
By Marks & Clerk
Attys.

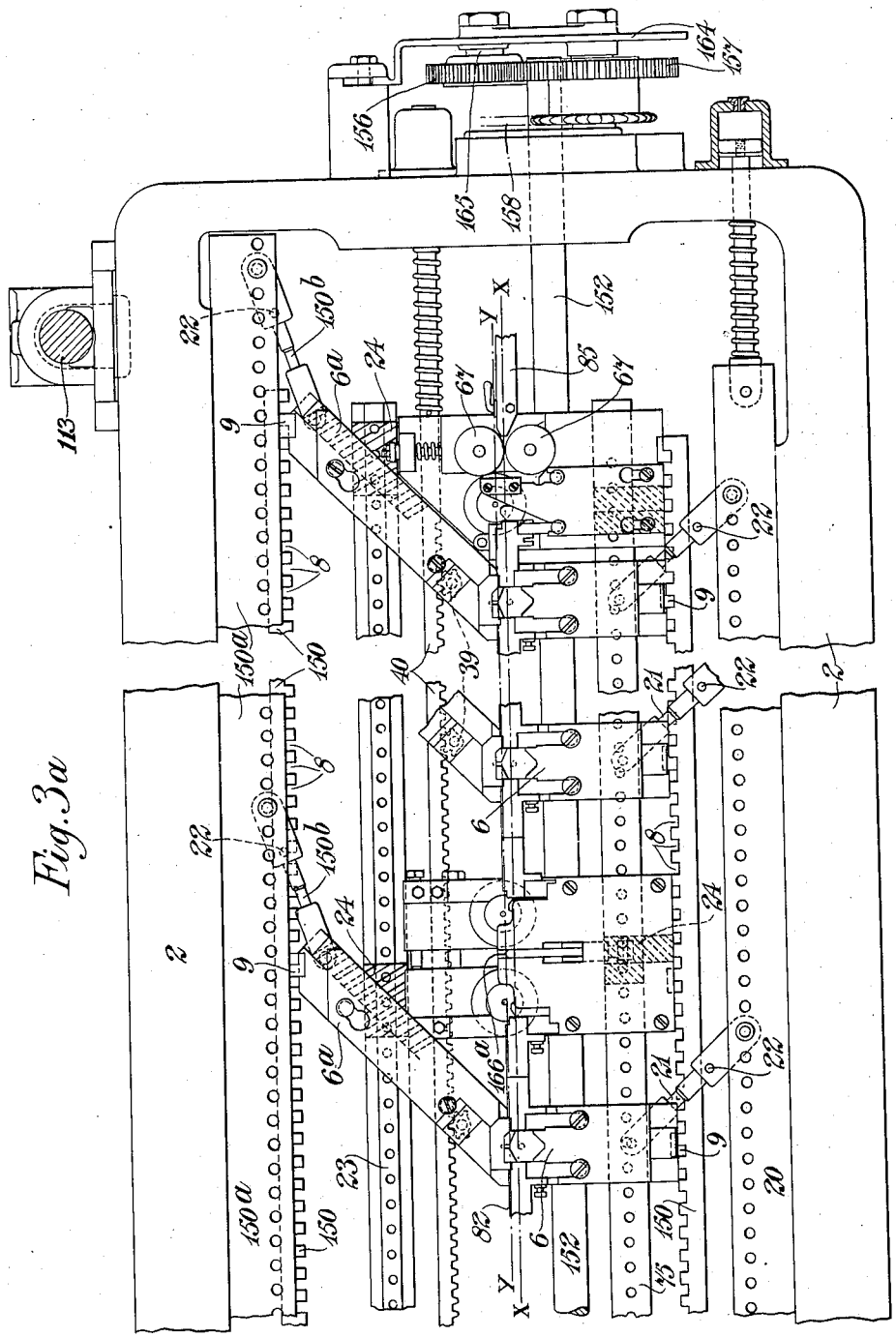

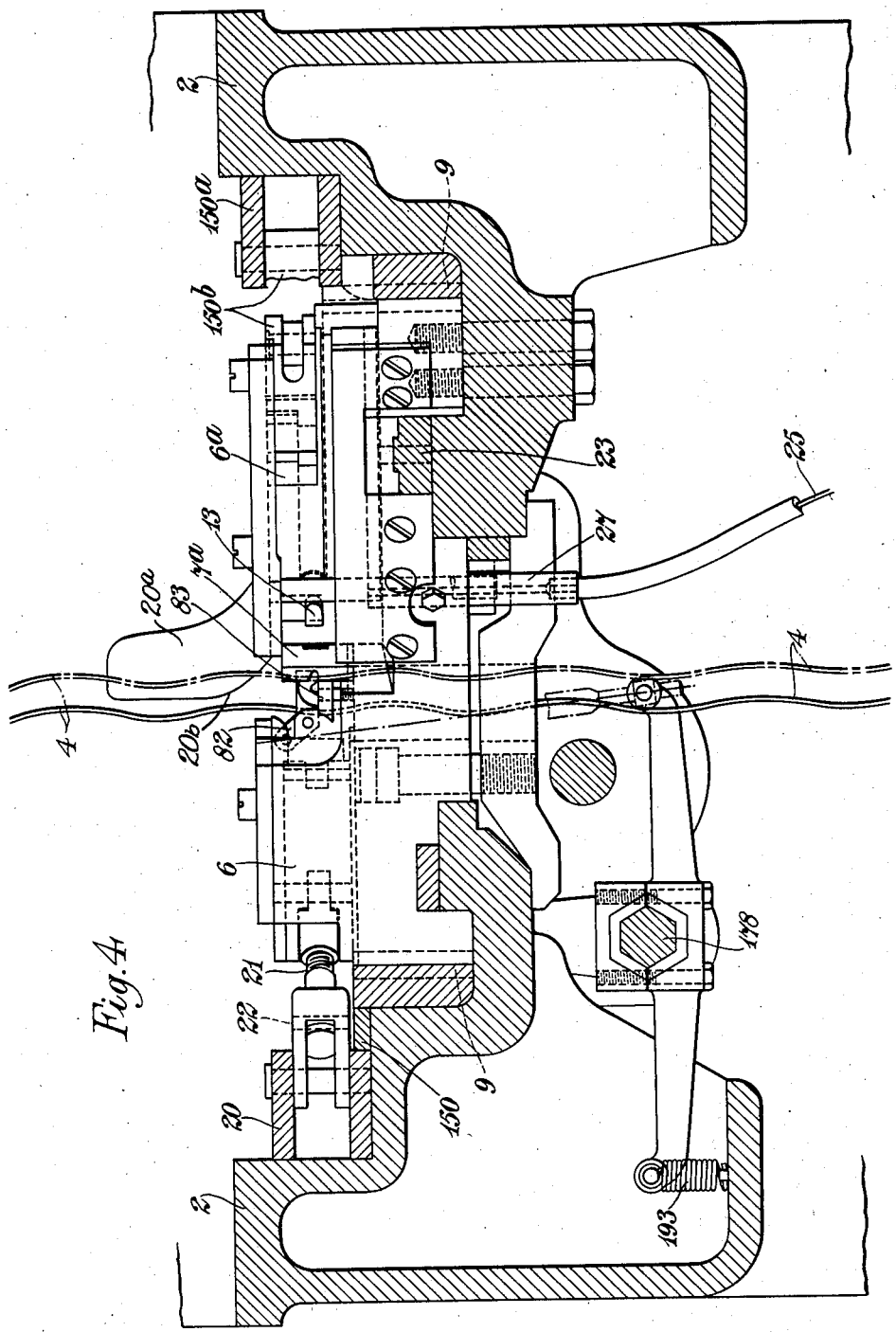

April 2, 1935.  A. E. BLASHILL  1,996,061
MACHINE FOR FORMING WIRE FABRIC
Filed June 18, 1931   29 Sheets-Sheet 6
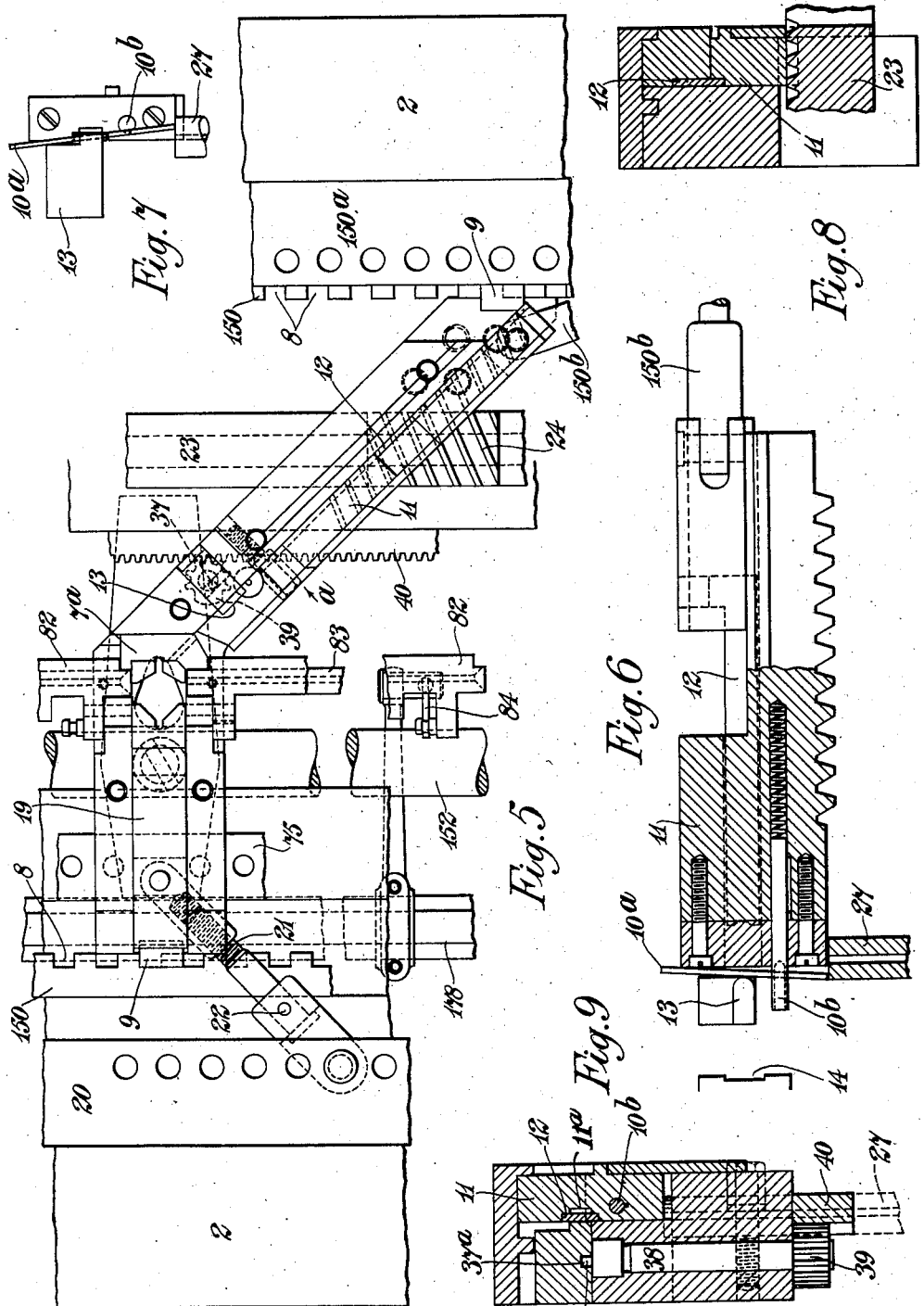
A.E. Blashill
Inventor
By Marks & Clerk
Attys.

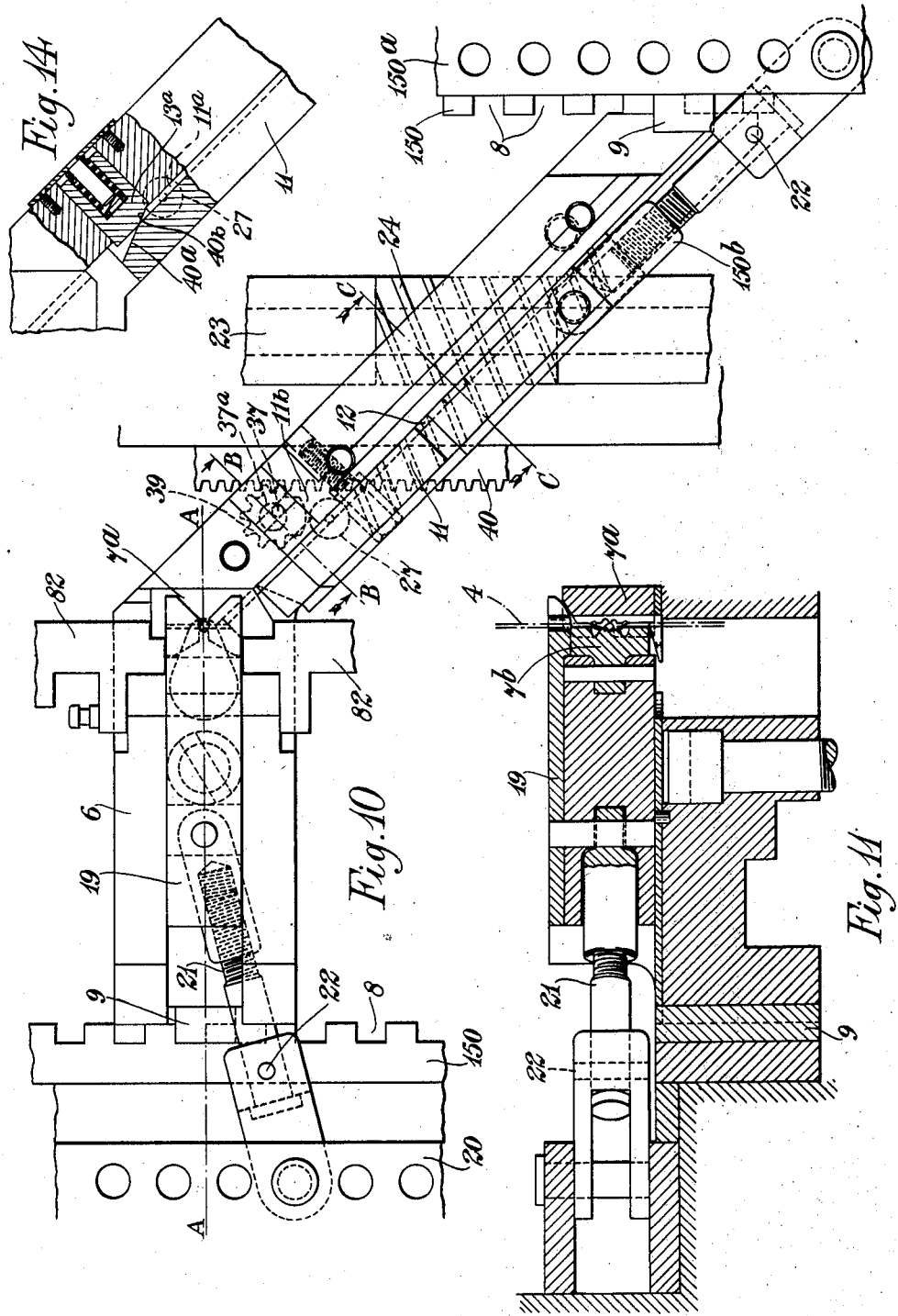

April 2, 1935. A. E. BLASHILL 1,996,061
MACHINE FOR FORMING WIRE FABRIC
Filed June 18, 1931 29 Sheets-Sheet 8
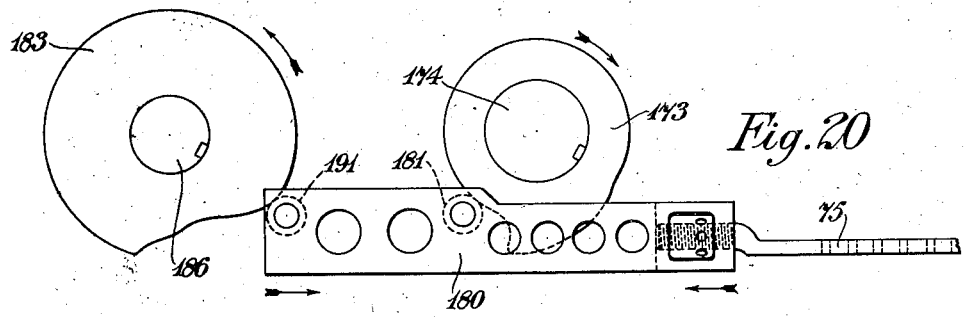
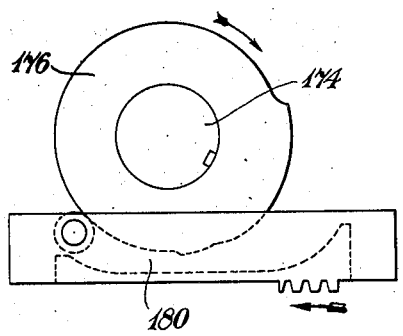
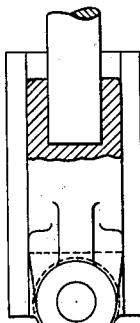
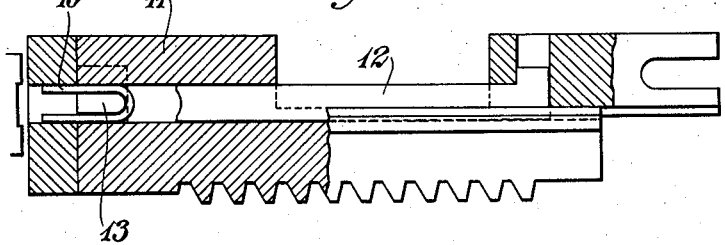
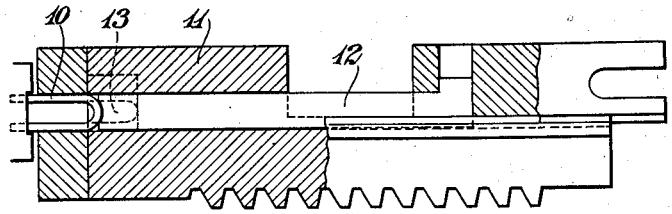
A. E. Blashill
Inventor
By Marks & Clerk
Attys.

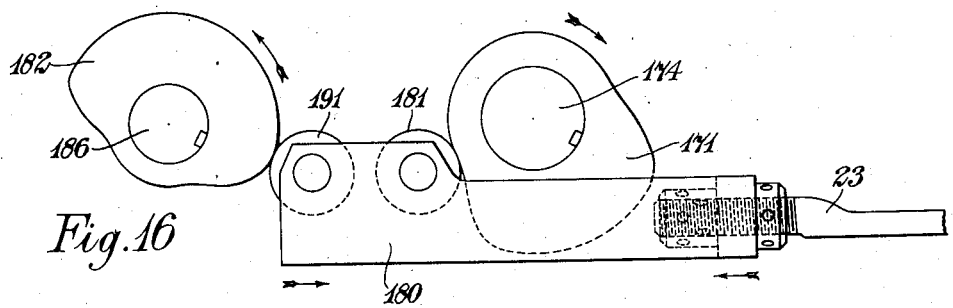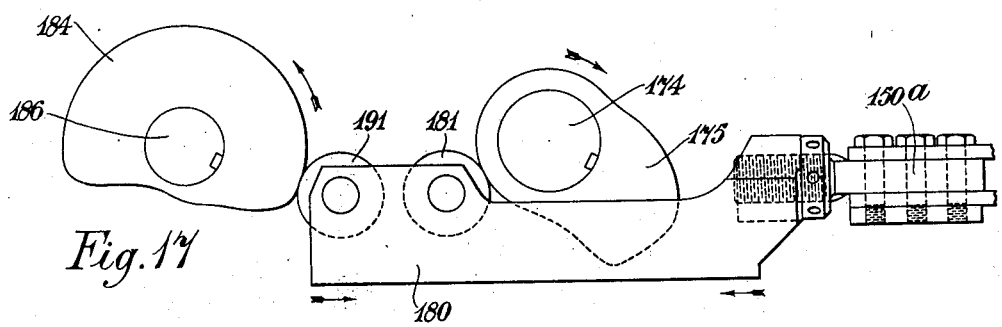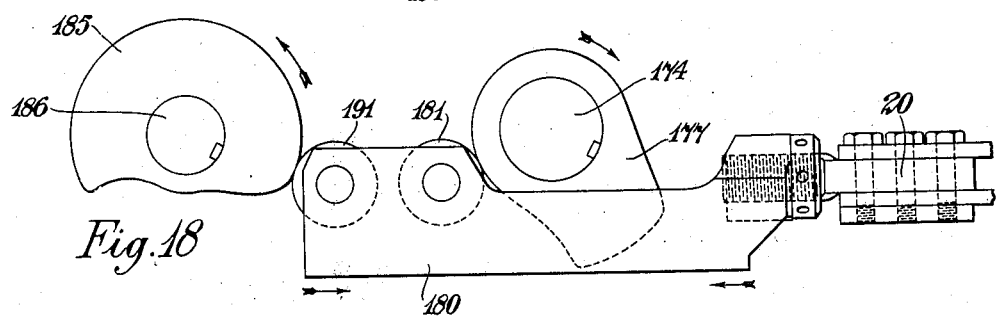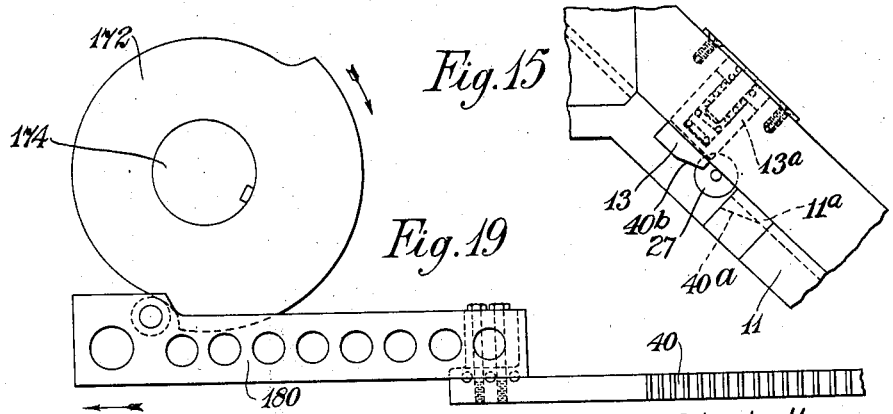

April 2, 1935.　　A. E. BLASHILL　　1,996,061
MACHINE FOR FORMING WIRE FABRIC
Filed June 18, 1931　　29 Sheets-Sheet 10

A. E. Blashill
Inventor
By Marke + Clerk
Attys.

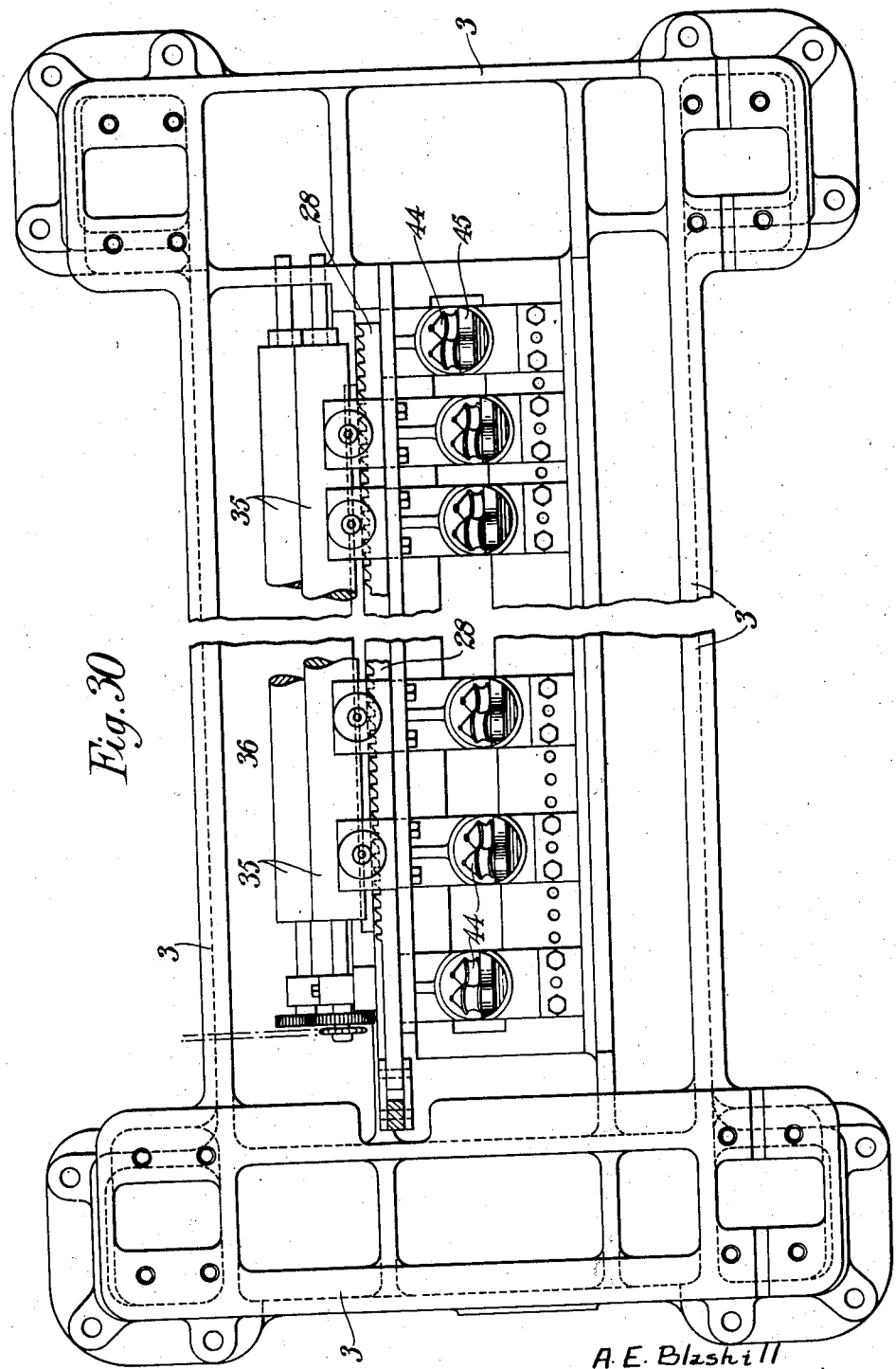

April 2, 1935.   A. E. BLASHILL   1,996,061
MACHINE FOR FORMING WIRE FABRIC
Filed June 18, 1931   29 Sheets-Sheet 12
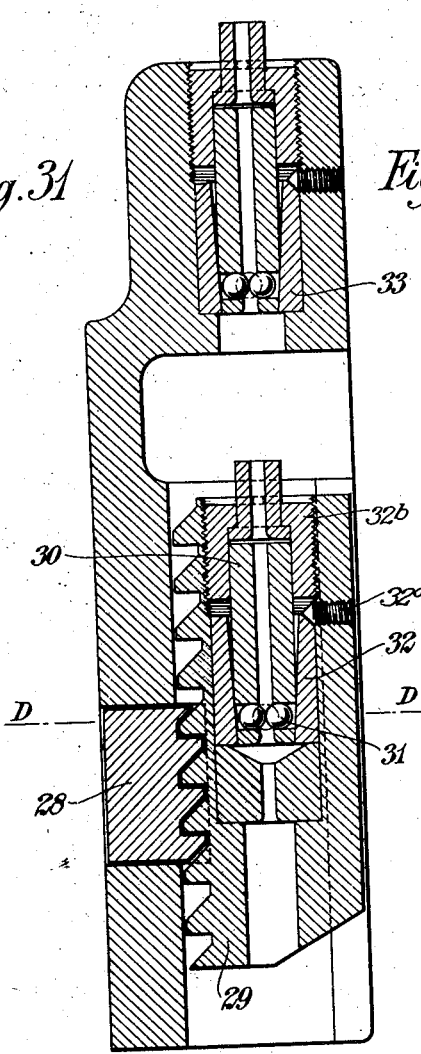
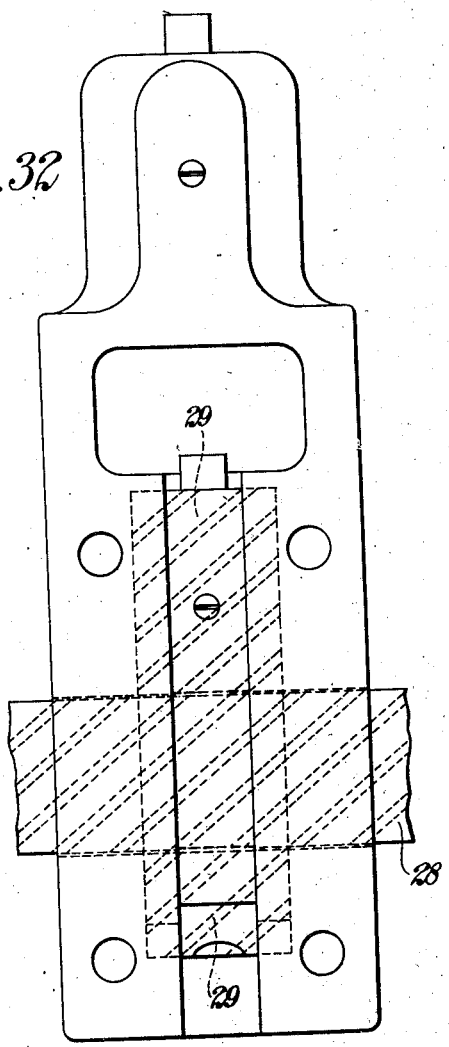
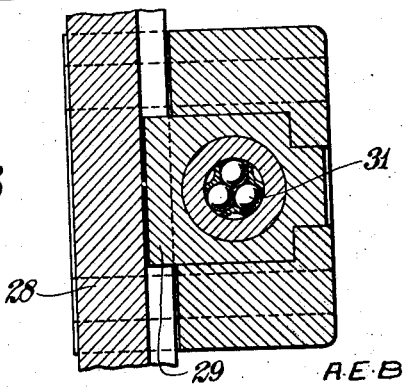
A. E. Blashill
Inventor
By Market Clerk
Attys.

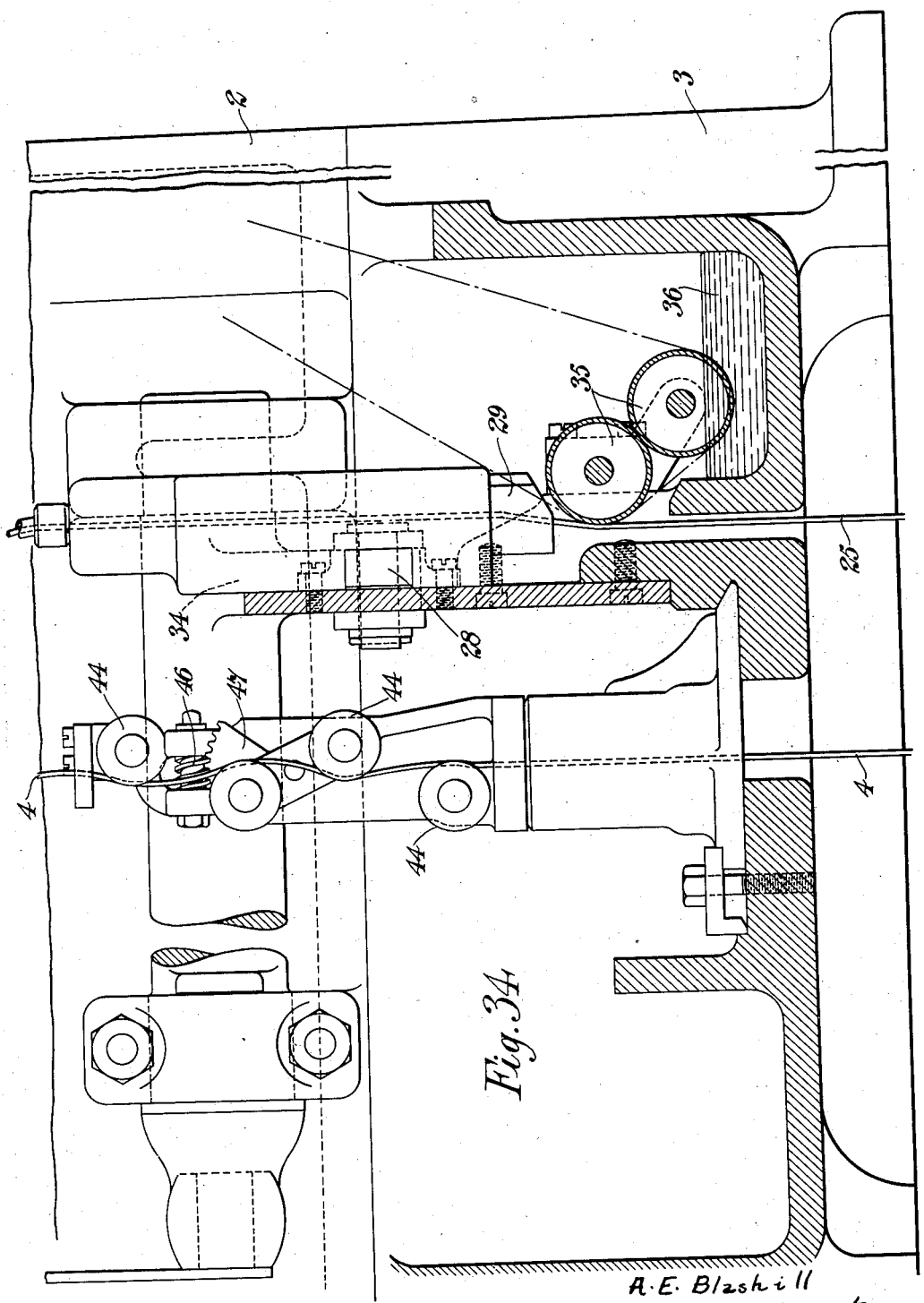

April 2, 1935.  A. E. BLASHILL  1,996,061
MACHINE FOR FORMING WIRE FABRIC
Filed June 18, 1931  29 Sheets-Sheet 14
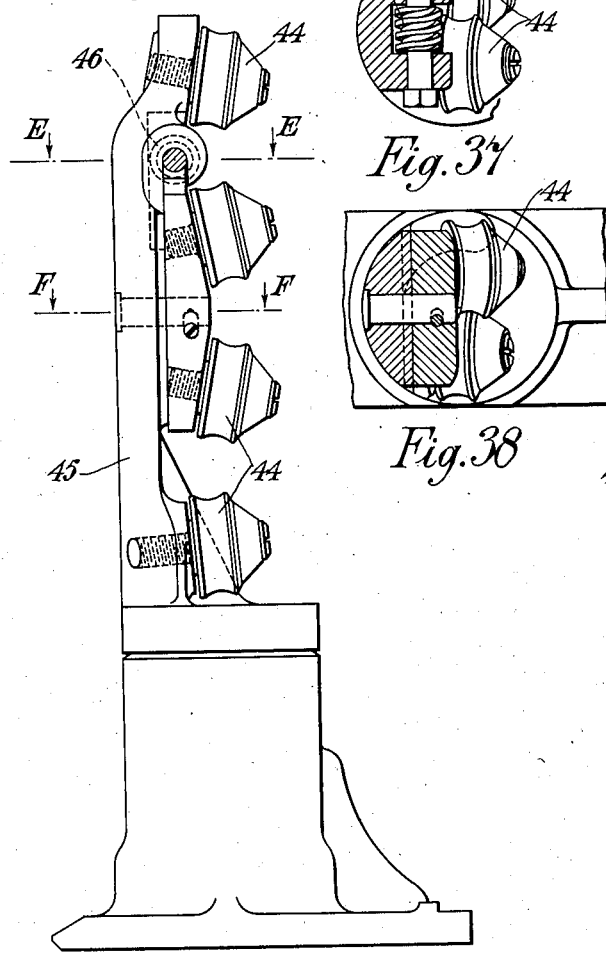
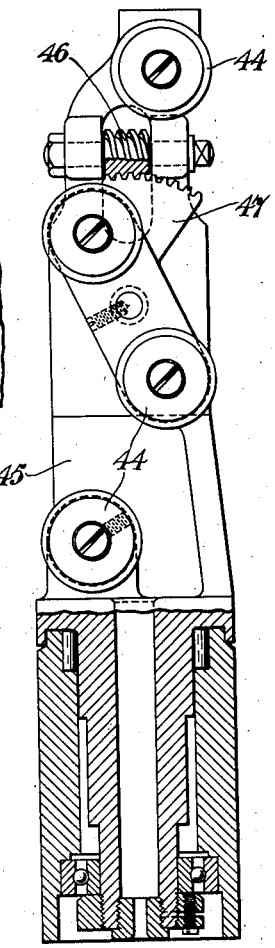
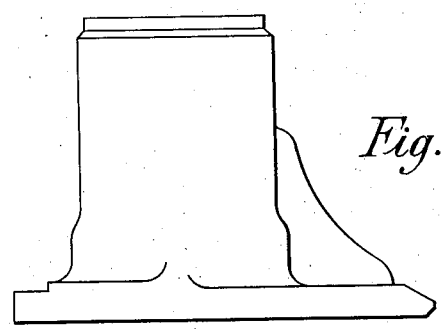
A. E. Blashill
Inventor
By Marks & Clerk
Attys.

April 2, 1935. A. E. BLASHILL 1,996,061
MACHINE FOR FORMING WIRE FABRIC
Filed June 18, 1931 29 Sheets-Sheet 15
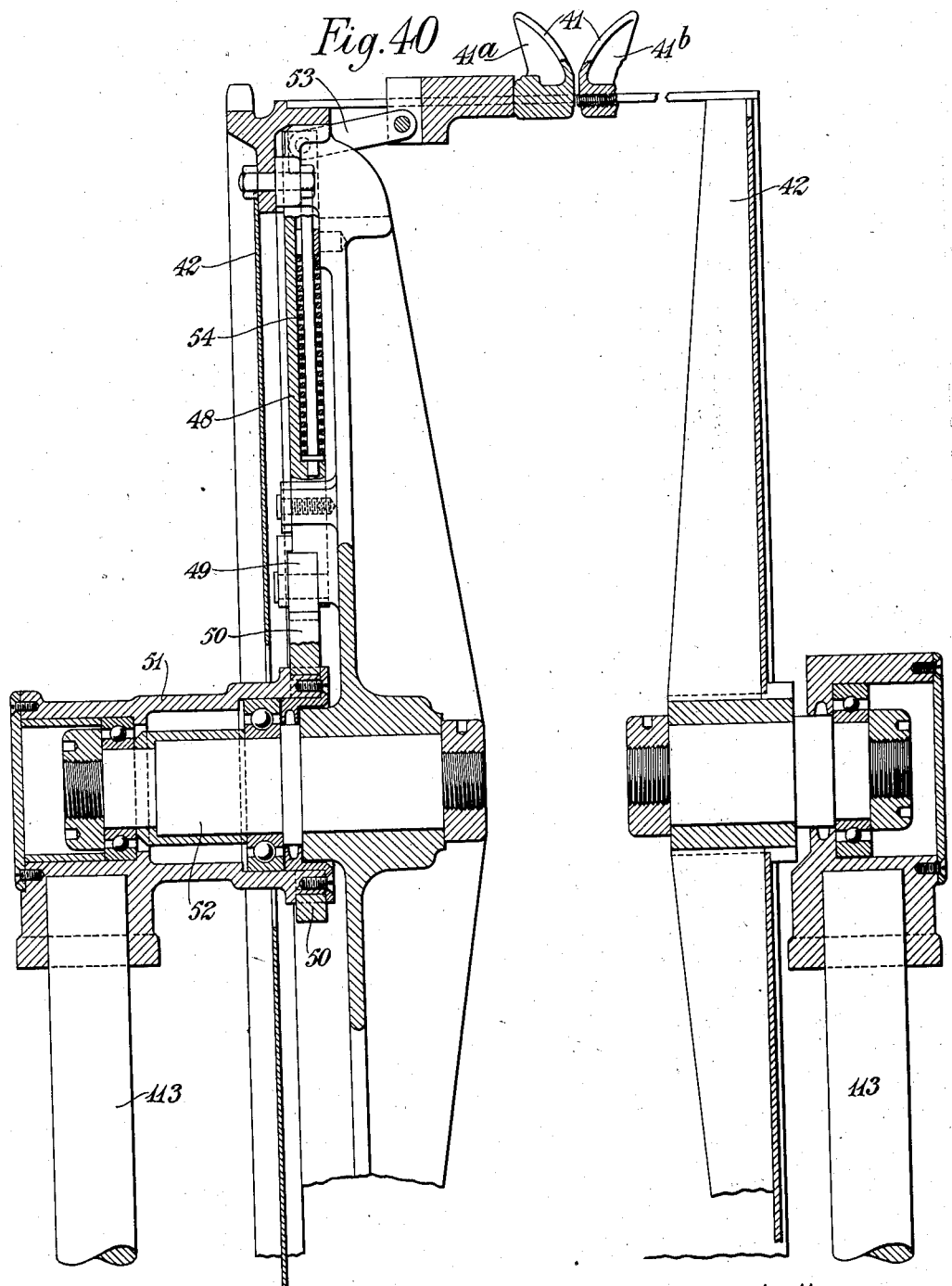

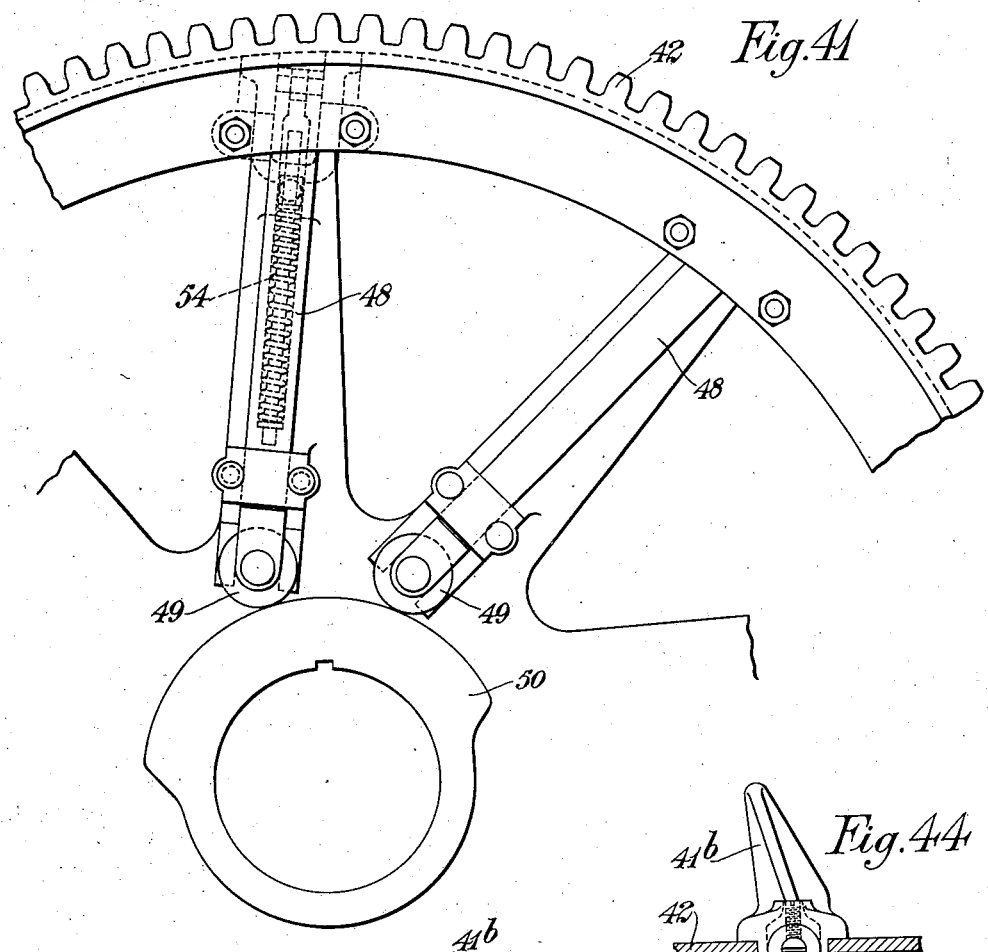

April 2, 1935. A. E. BLASHILL 1,996,061
MACHINE FOR FORMING WIRE FABRIC
Filed June 18, 1931  29 Sheets-Sheet 17
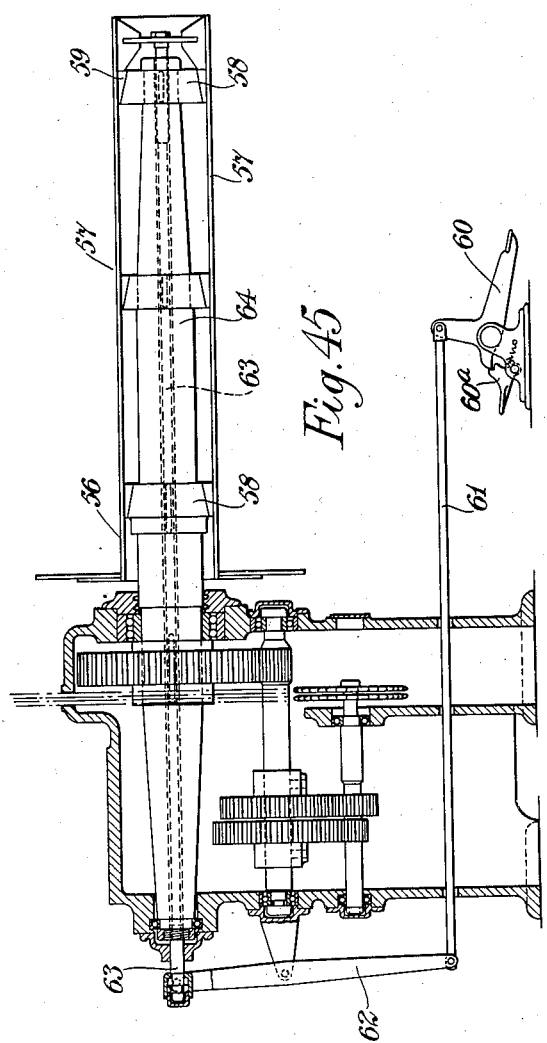
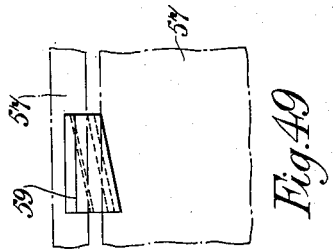
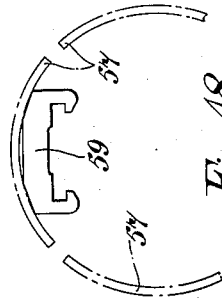
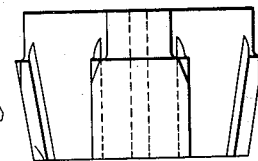
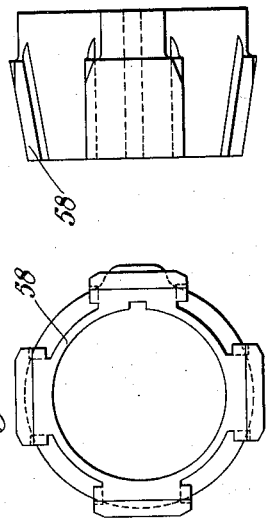
A. E. Blashill
INVENTOR
By Marks & Clerk
Attys.

April 2, 1935.   A. E. BLASHILL   1,996,061
MACHINE FOR FORMING WIRE FABRIC
Filed June 18, 1931   29 Sheets-Sheet 18

A. E. Blashill
INVENTOR

By: Marks & Clerk
ATTYS.

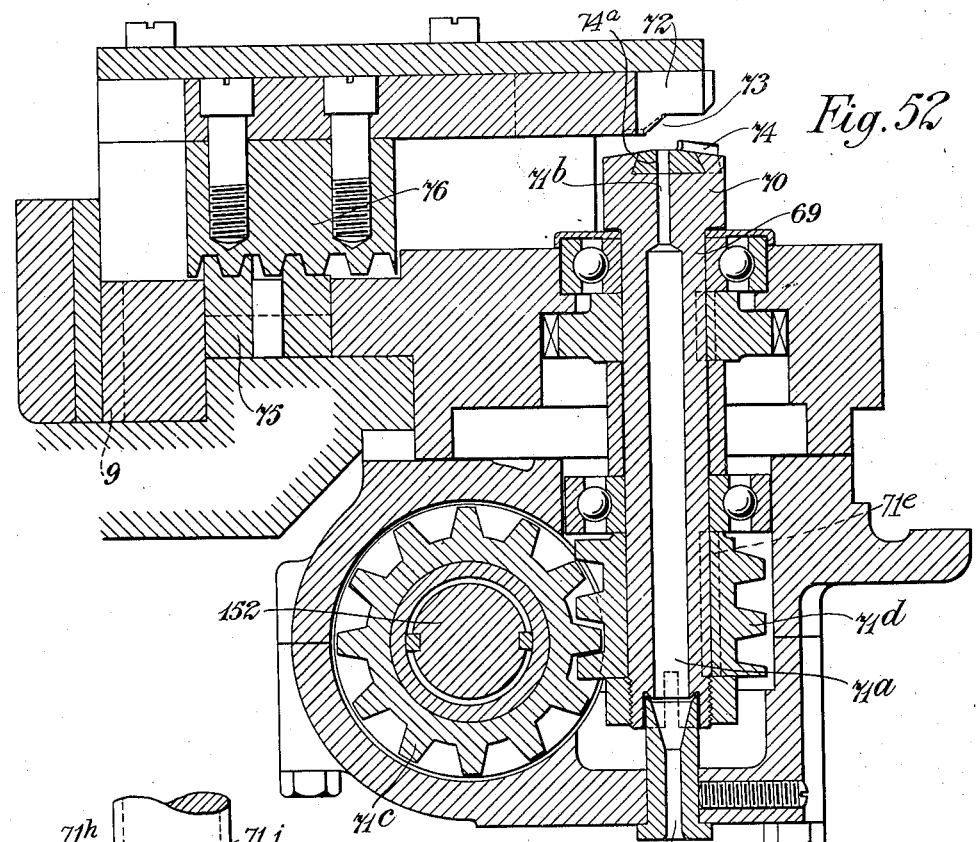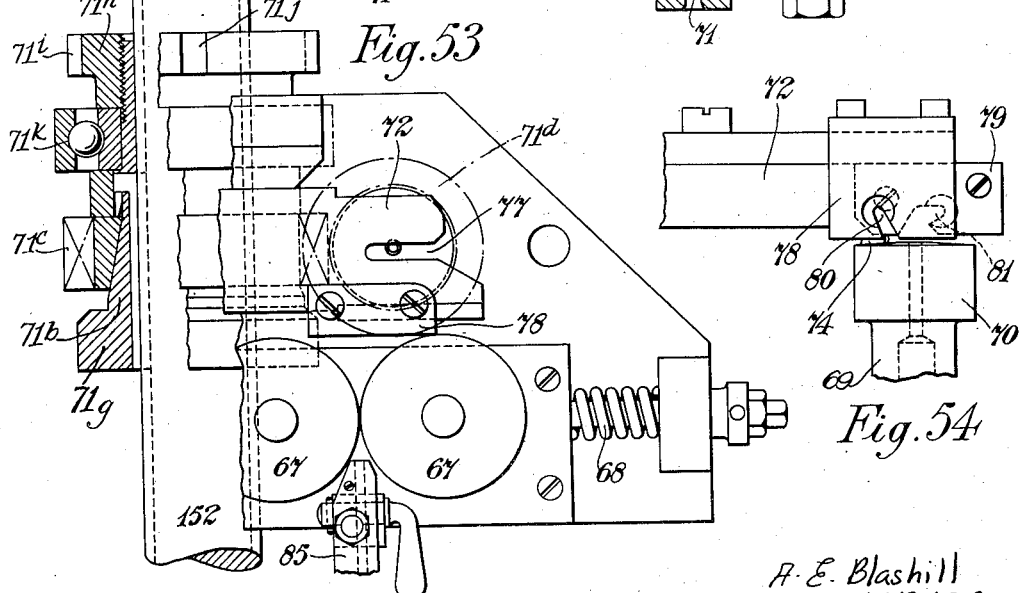

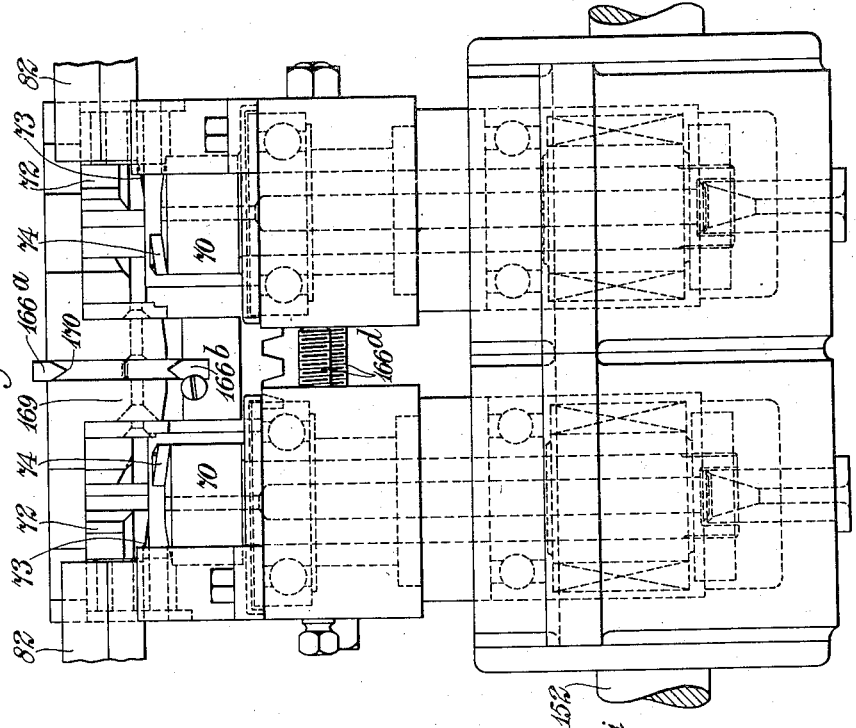

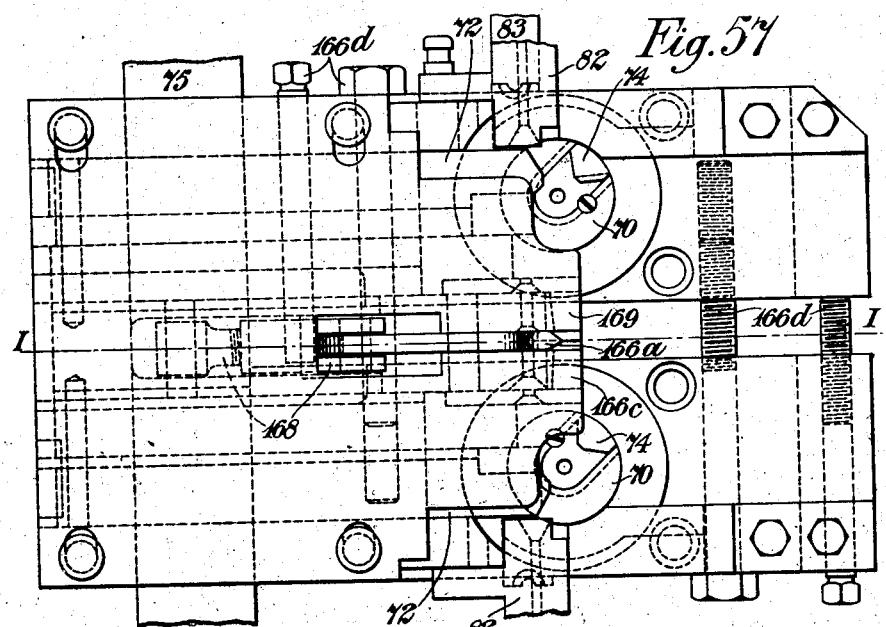
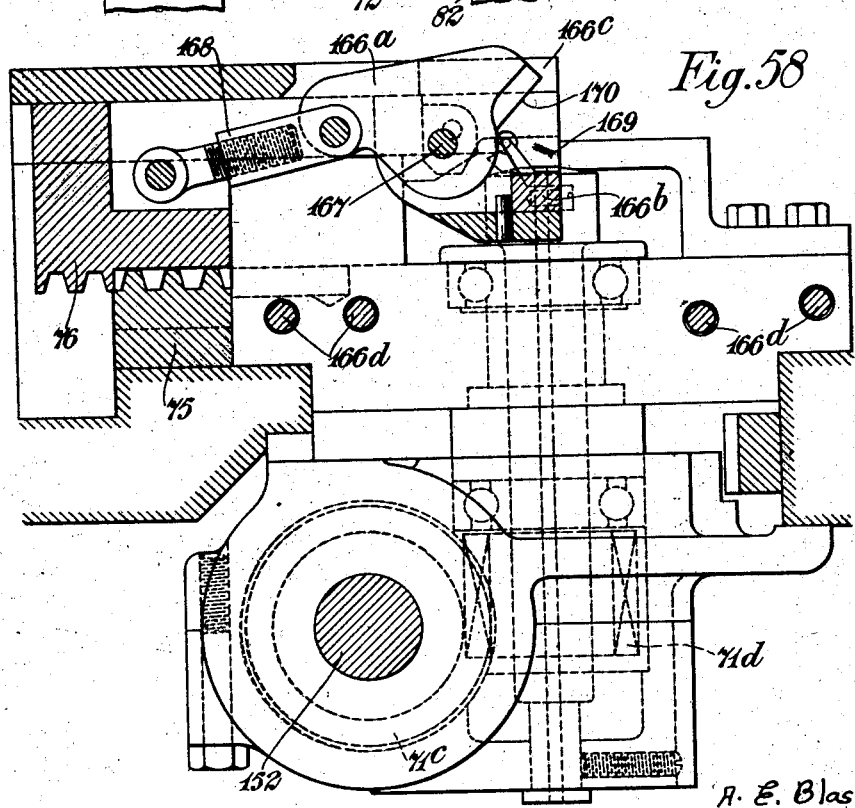

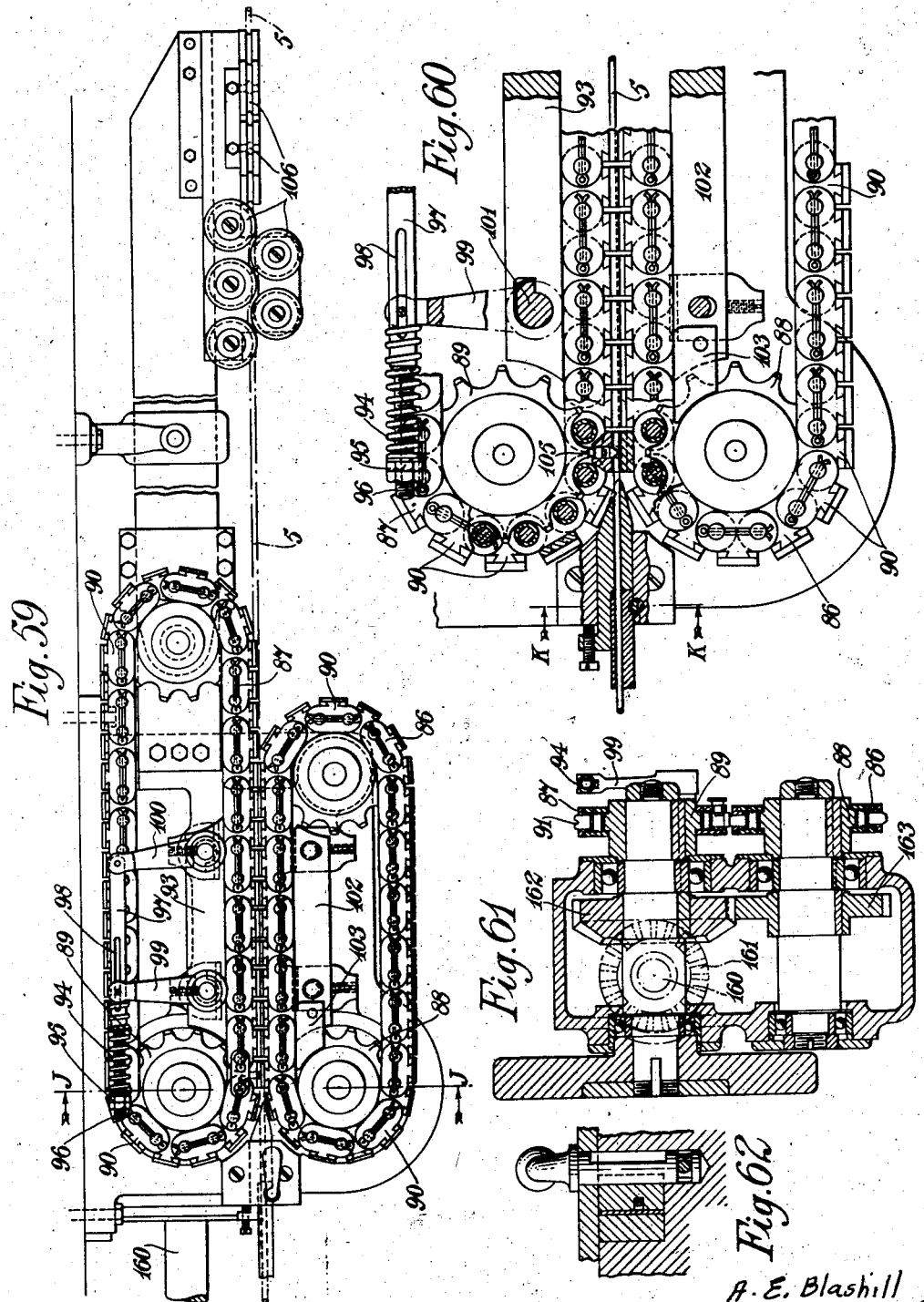

April 2, 1935. A. E. BLASHILL 1,996,061
MACHINE FOR FORMING WIRE FABRIC
Filed June 18, 1931 29 Sheets-Sheet 23
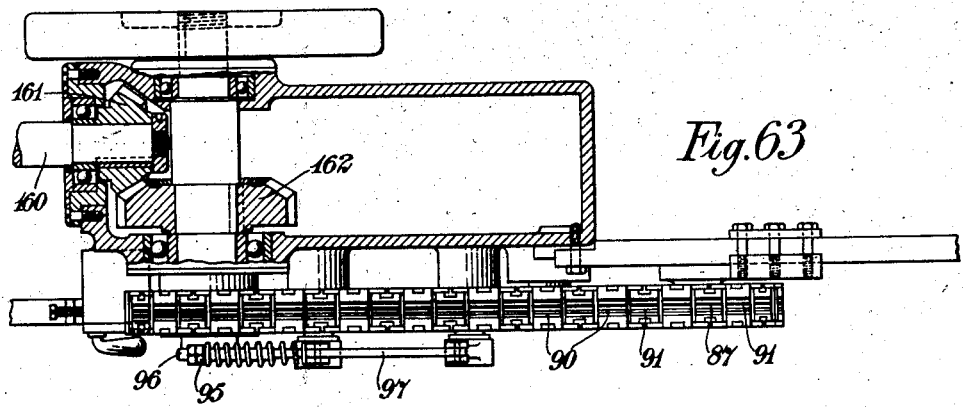
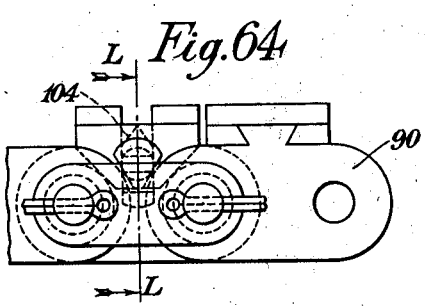
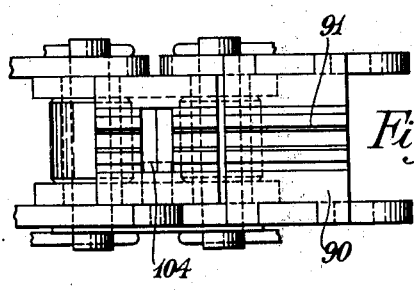
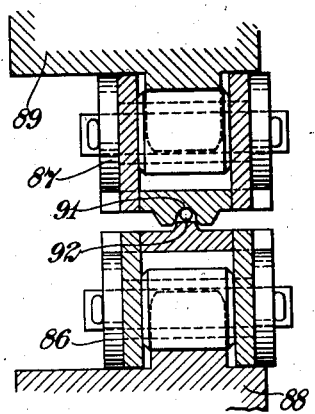
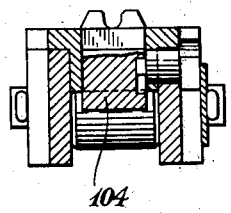
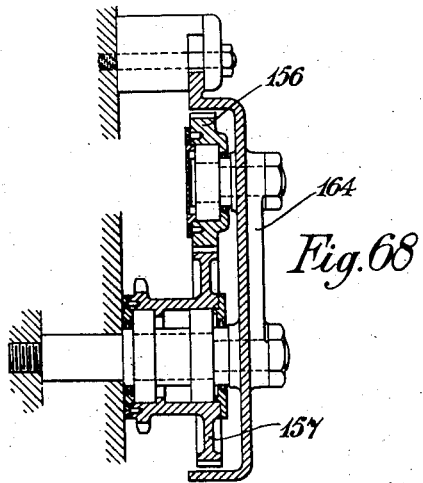
A. E. Blashill
INVENTOR
By: Marks & Clerk
ATT'YS.

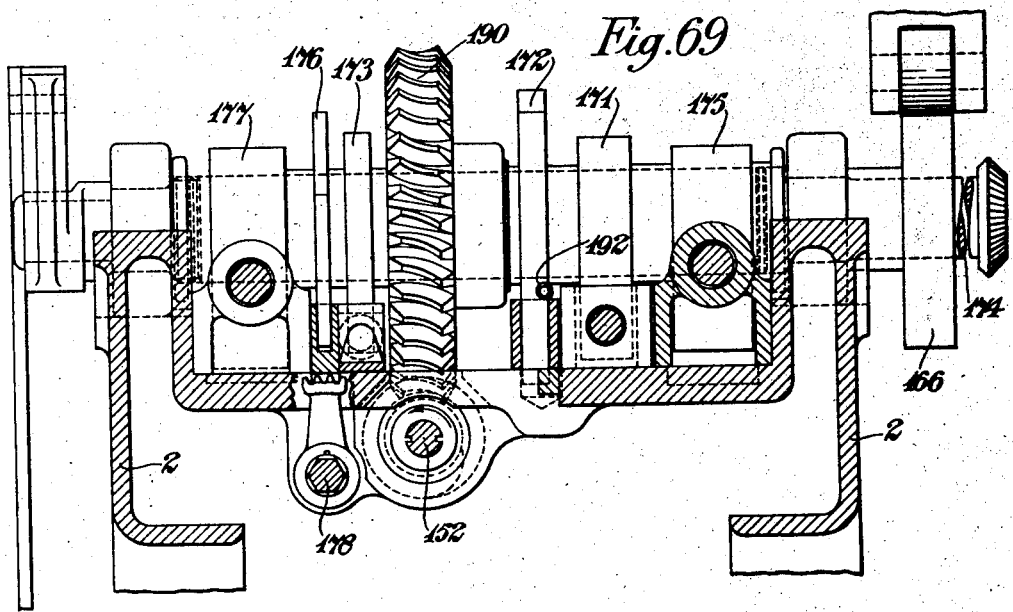
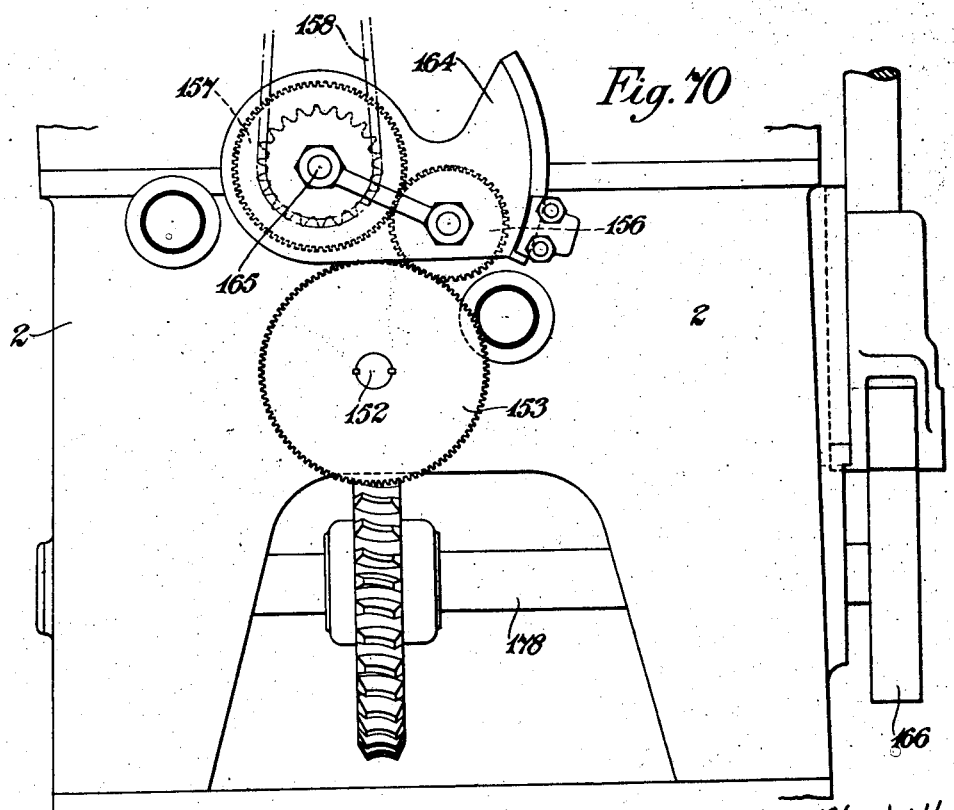

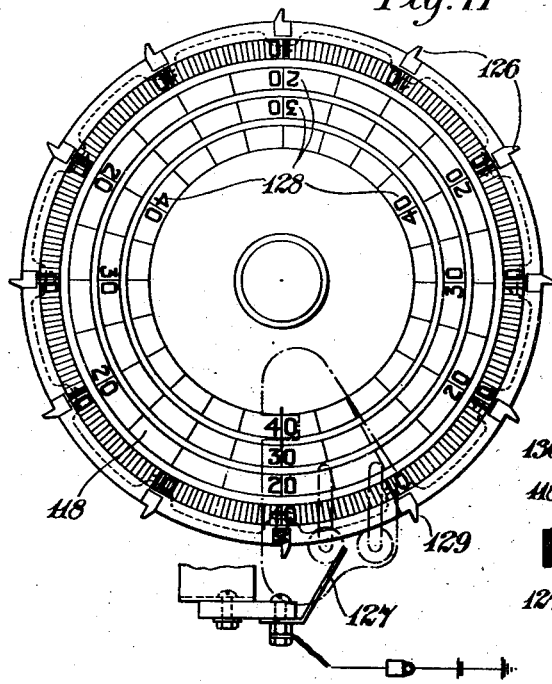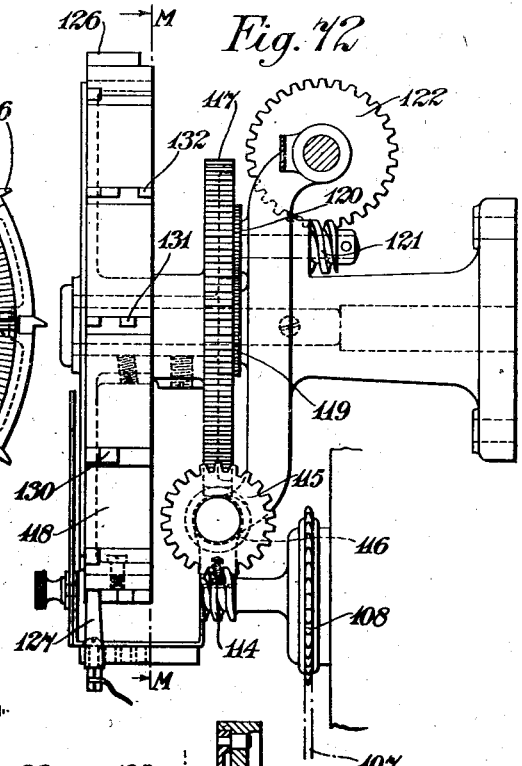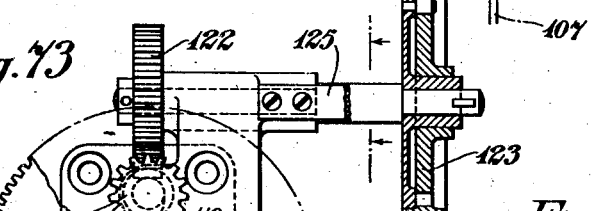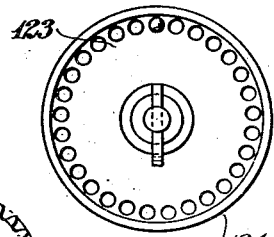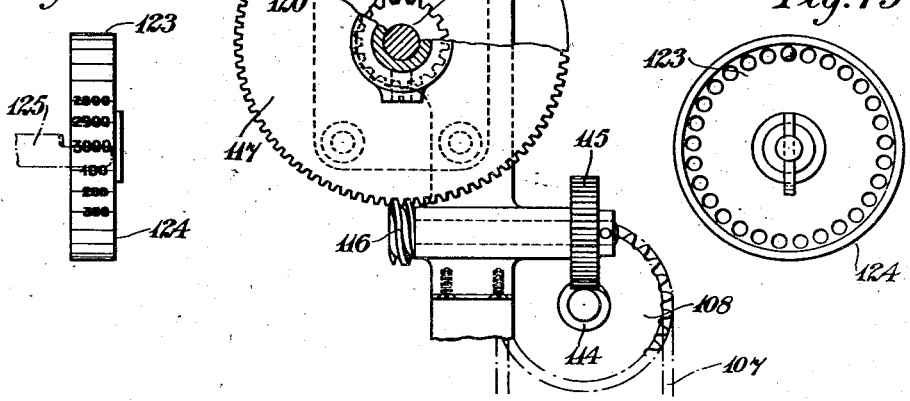

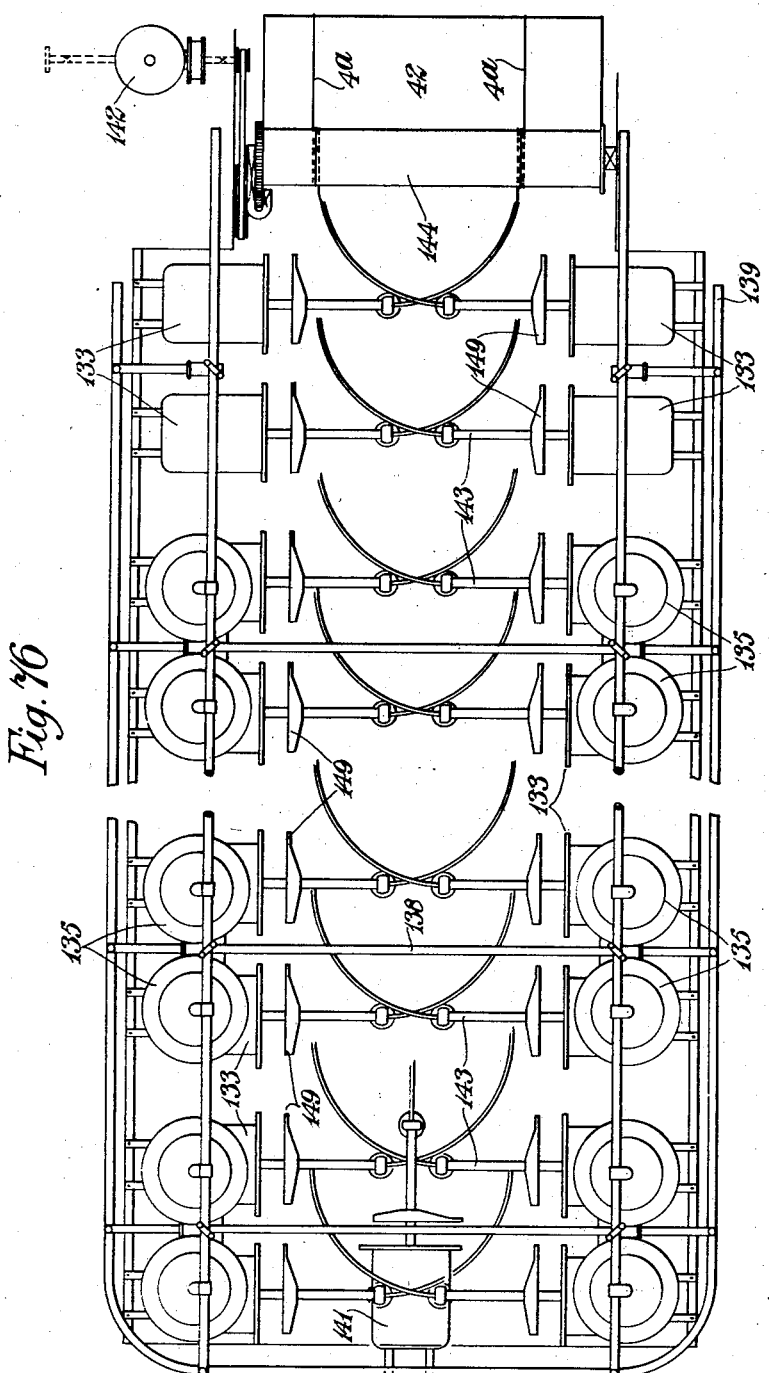

April 2, 1935. A. E. BLASHILL 1,996,061
MACHINE FOR FORMING WIRE FABRIC
Filed June 18, 1931 29 Sheets-Sheet 27
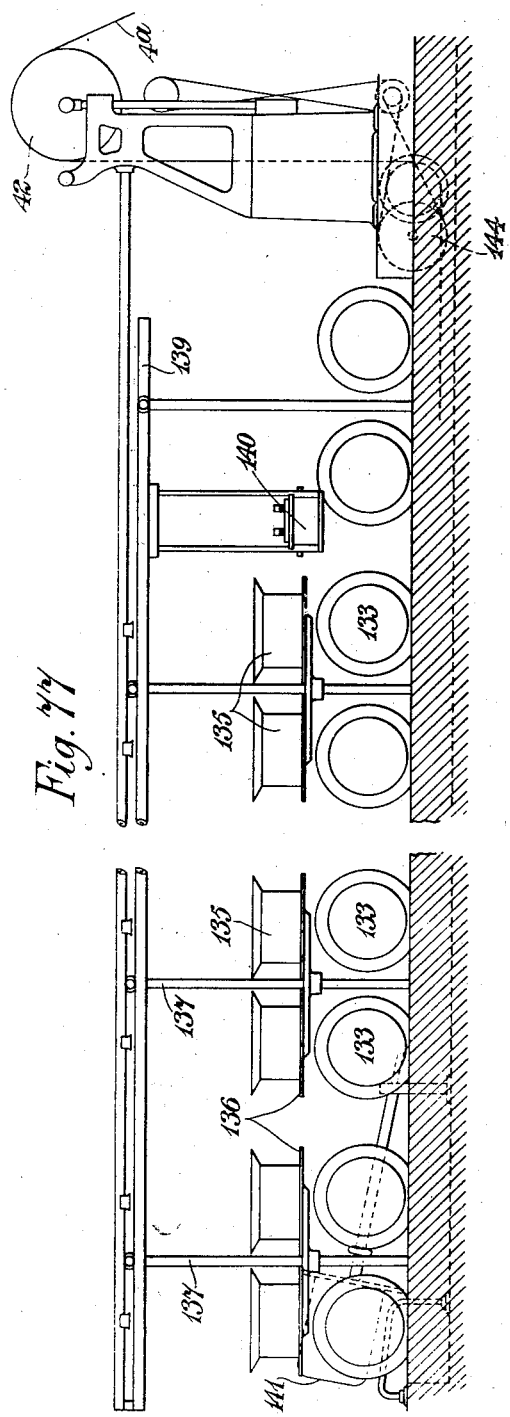
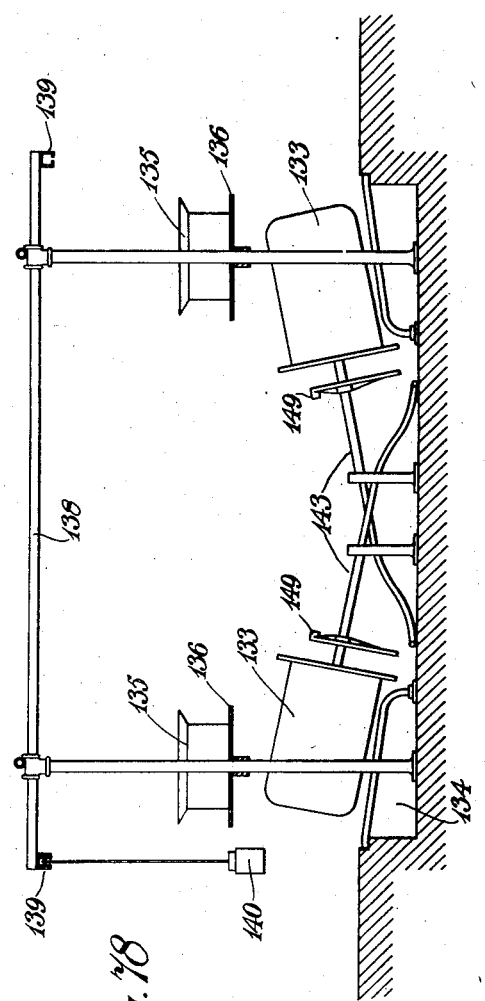

April 2, 1935.  A. E. BLASHILL  1,996,061
MACHINE FOR FORMING WIRE FABRIC
Filed June 18, 1931   29 Sheets-Sheet 28
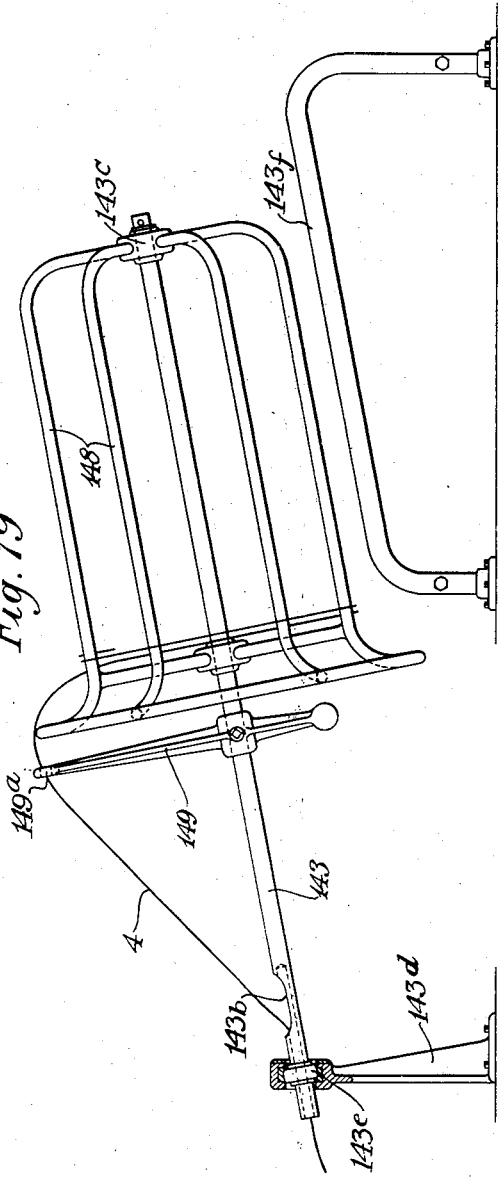
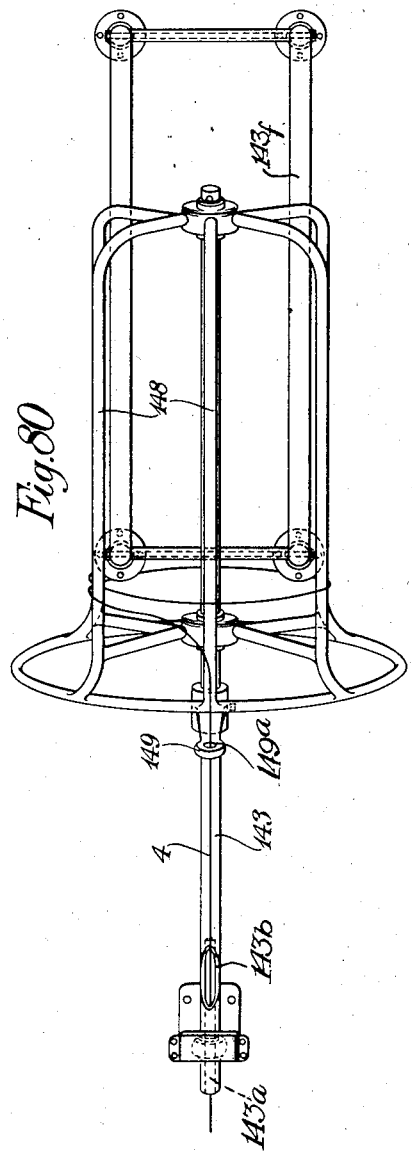
A. E. Blashill
INVENTOR
By: Marks & Clerk
Attys.

April 2, 1935. A. E. BLASHILL 1,996,061
MACHINE FOR FORMING WIRE FABRIC
Filed June 18, 1931 29 Sheets-Sheet 29
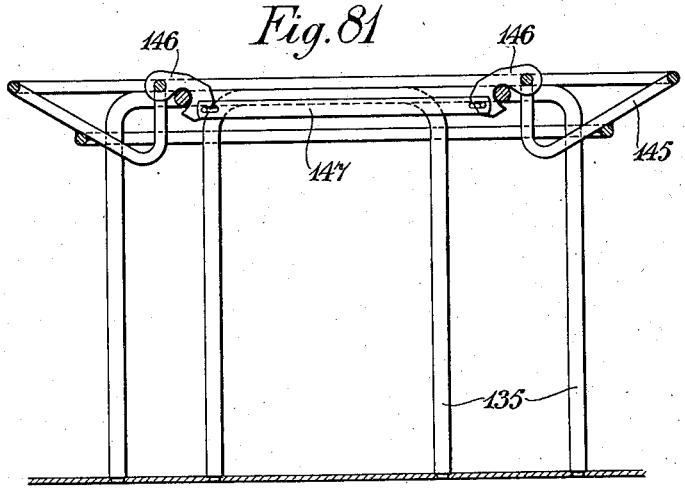
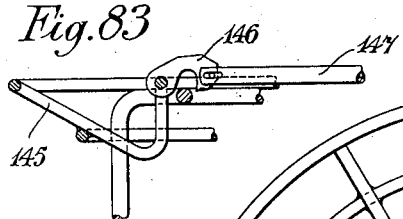
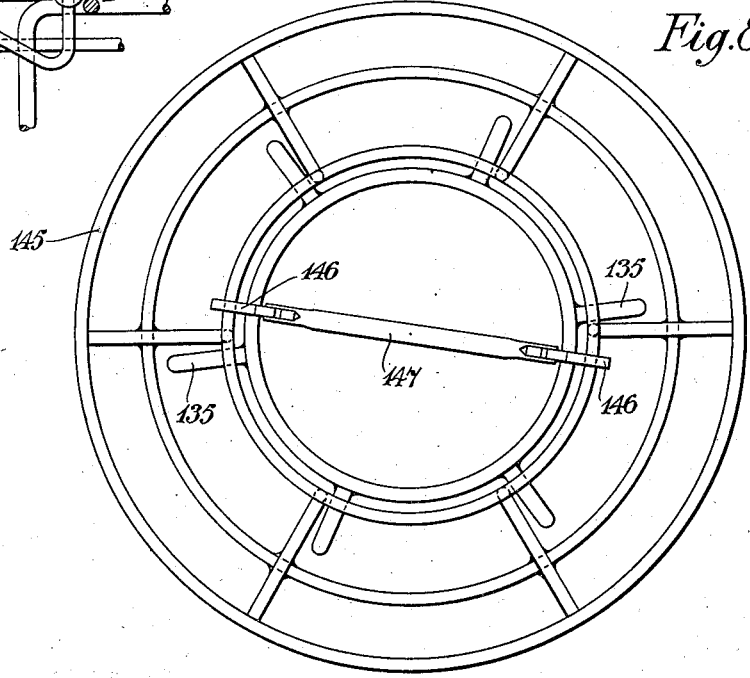
A. E. Blashill
INVENTOR
By: Marks & Clark
ATTYS.

Patented Apr. 2, 1935

1,996,061

UNITED STATES PATENT OFFICE 1,996,061

MACHINE FOR FORMING WIRE FABRIC

Arthur Ernest Blashill, Sheffield, England

Application June 18, 1931, Serial No. 545,321
In Great Britain June 24, 1930

45 Claims. (Cl. 140—11)

This invention relates to a machine for forming wire fabric more particularly of the square or rectangular mesh kind built up of at least two separate series of suitably spaced wires running in directions at right angles or substantially so to each other and hereinafter referred to as "line" wires and "stay" wires respectively, the former of which usually constitutes the longitudinal wires in the finished fabric, fence, or the like while the latter usually constitutes the vertical wires.

More particularly the invention relates to a machine of the above kind for producing wire fabric as above described in which the intermediate line wires are connected to the stay wires at the points of intersection by separately attached wire locks formed around the two series of intersecting wires while the ends of the stay wires are wound around the outer line wires hereinafter referred to as "margin" wires.

It is the object of the invention to provide an improved machine of the above kind which is much more efficient than the machines hitherto adopted and with which a higher speed of operation is obtainable such that the machine will operate to produce the wire fabric on a successful commercial basis while at the same time the fabric produced has greater durability and will more efficiently withstand the conditions imposed thereon during use than is the case with the fabric hitherto produced.

It is also an object of the invention to provide a machine of the above kind in which simplicity of manufacture of the various operative parts of the machine is secured while the cost of manufacture thereof is reduced to a minimum and at the same time the efficiency of the machine increased.

In the accompanying drawings:—

Figure 1 is a front elevation of one form of machine in accordance with the invention.

Figure 2 is an end elevation of the machine illustrated in Figure 1, this figure also showing the wind-up mechanism for the manufactured fabric.

Figure 3a is a fragmentary plan illustrating other dies and mechanism for actuating same and also centre twisters and the left-hand twister.

Figure 4 is a cross-sectional view of the die-operating mechanism and associated parts illustrated in Figures 3 and 3a, this figure showing one of the line wires and also one of the staple wires, the pair of dies shown in this figure being open.

Figure 5 is a fragmentary plan view showing a pair of dies in open position.

Figure 6 is a part sectional elevation of the staple-forming mechanism taken in the direction of the arrow $a$ in Figure 5 and showing the staple-forming slide in an advanced position where it has cut off a portion of the staple wire.

Figure 7 is a detail view of the staple-forming mechanism.

Figure 8 is a cross-section taken on the line C—C in Figure 10.

Figure 9 is a cross-section taken on the line B—B in Figure 10.

Figure 10 is a fragmentary plan view on an enlarged scale similar to Figure 5 but showing the dies closed and the staple former in the advanced position.

Figure 11 is a sectional elevation taken on the line A—A in Figure 10.

Figures 12 and 13 are detail views illustrating the staple-forming mechanism in different operative positions.

Figure 14 is a detail view illustrating a modified form of anvil for the staple-forming mechanism.

Figure 15 is a similar view to Figure 14 but showing the anvil in its normal position ready for the forming of a staple.

Figures 16, 17, 18, 19, 20, 21 and 22 are views illustrating the different cams employed in the machine.

Figure 30 is a fragmentary plan view showing some of the coilers for the line wires.

Figure 31 is a sectional elevation on an enlarged scale of the staple wire feed mechanism.

Figure 32 is an elevation of Figure 31.

Figure 33 is a cross section taken on the line D—D in Figure 31.

Figure 34 is a fragmentary end view partly in section showing the coilers for one of the line wires, this figure also showing one of the staple wires and the arrangement which may be adopted for supplying lubricant thereto.

Figures 35, 36, 37 and 38 are views illustrating the coilers for the line wires, Figure 35 being an end elevation; Figure 36 is a front view; Figure 37 a part sectional plan view on the line E—E in Figure 35 and Figure 38 a part sectional plan view on the line F—F in Figure 35.

Figure 39 illustrates a modified arrangement of base for carrying the coilers of the machine.

Figure 40 is a fragmentary cross-sectional view of the measuring drum.

Figure 41 is a fragmentary side view of the measuring drum.

Figures 42, 43 and 44 illustrate details of the measuring drum.

Figure 45 is a part sectional elevation showing the wind-up drum for the manufactured fabric and showing the drum in expanded position.

Figures 46, 47, 48 and 49 illustrate details of the wind-up drum.

Figure 50:
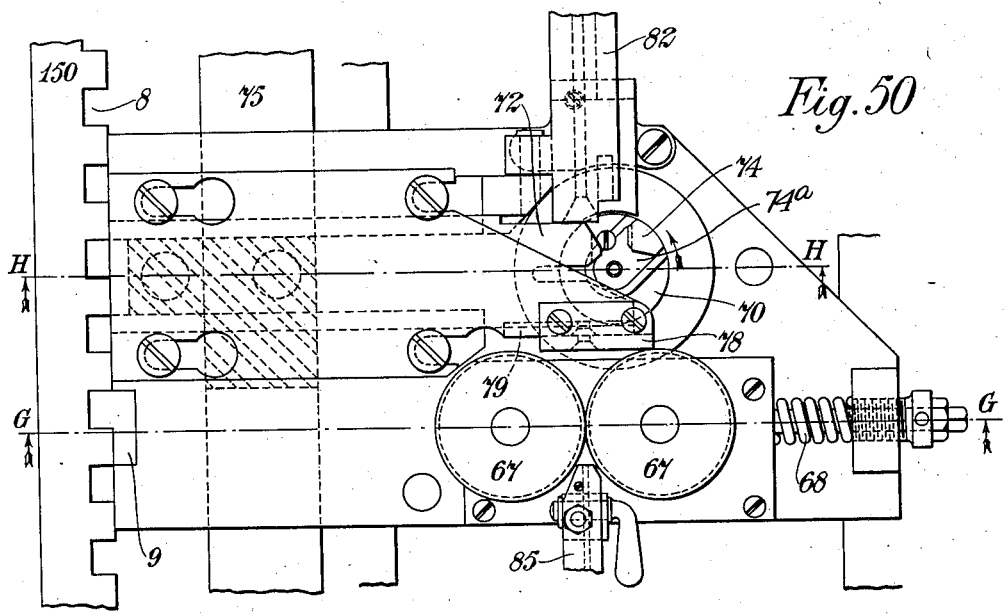

Figure 50 is a fragmentary plan view illustrating the left-hand twisters.

Figure 51:
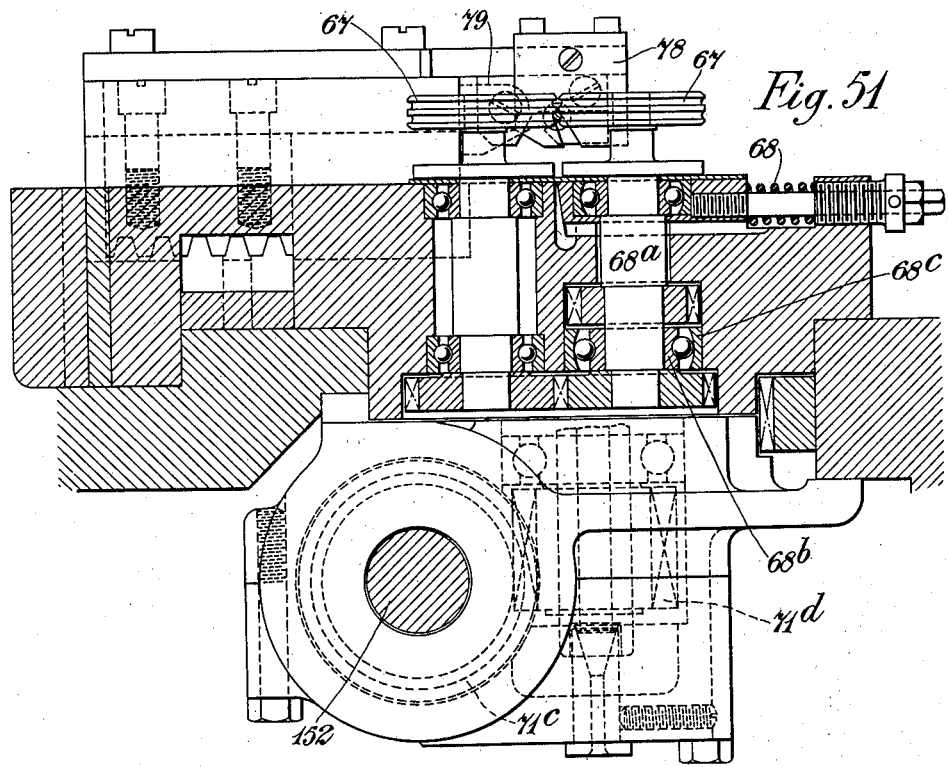

Figure 51 is a sectional elevation taken on the line G—G in Figure 50.

Figure 52 is a sectional elevation taken on the line H—H in Figure 50.

Figure 53 is a part sectional plan view illustrating a detail of the drive for the left-hand twisters.

Figure 54 is a detail elevational view of the stay wire fender and gripper.

Figure 55 is a fragmentary front elevation illustrating the right-hand twisters.

Figure 56 is a fragmentary elevation illustrating the centre twisters and the cutter.

Figure 57 is a fragmentary plan view of Figure 56.

Figure 58 is a sectional elevation taken on the line I—I in Figure 57.

Figure 59 is a front elevation of mechanism employed in accordance with this invention for feeding predetermined lengths of wire and which may be employed for feeding predetermined severed lengths of stay wire in the machine provided in accordance with the invention for the production of wire fabric.

Figure 60 is a fragmentary view party in section of the left-hand side of the mechanism illustrated in Figure 59.

Figure 61 is a sectional elevation taken on the line J—J in Figure 59.

Figure 62 is a fragmentary part sectional view taken on the line K—K in Figure 60.

Figure 63 is a part sectional plan view of the mechanism illustrated in Figure 59.

Figures 64, 65 and 66 are detail views of the cutter of the feeding mechanism illustrated in Figures 59 to 63, Figure 66 being a cross section on the line L—L in Figure 64.

Figure 67 is a cross section on an enlarged scale showing the wire gripped between a pair of links of the feeding mechanism.

Figure 68 is a fragmentary sectional view showing the mechanism employed for varying the spacing between the stay wires.

Figure 69 is a cross section showing the main cam shaft for operating the dies and other mechanisms of the machine.

Figure 70 is a front view on an enlarged scale of the mechanism illustrated in Figure 68.

Figure 71 is an end view of the counter mechanism provided in accordance with the invention.

Figure 72 is a side view of Figure 71.

Figure 73 is a part sectional view taken on the line M—M in Figure 72.

Figures 74 and 75 illustrate details of the counter mechanism.

Figure 76 is a plan view illustrating the improved lay-out of reels according to the invention and as applied in connection with the improved machine provided in accordance therewith for producing wire fabric.

Figure 77 is an elevation partly in section of Figure 76.

Figure 78 is a cross section of Figures 76 and 77.

Figures 79 and 80 are elevation and plan views respectively illustrating an improved form of reel in accordance with the invention and which reels are indicated diagrammatically in Figures 76 to 78.

Figures 81, 82 and 83 are views illustrating a preferred form of bobbin in accordance with the invention.

Figure 84 is a part sectional view of a preferred form of main clutch for the machine, the clutch being indicated generally in Figures 1 and 2.

In carrying the invention into effect in one convenient manner and as applied by way of example to a machine for producing wire fabric of the kind above described the machine frame comprises vertical members 1 (Figures 1 and 2) mounted upon upper and lower tablelike members 2 and 3, the upper member 2 serving as a table for supporting parts of the operating gear, presently to be described, including a series of wire lock formers which are arranged in a horizontal plane and are adapted to form a series of wire locks and simultaneously lock together the intersecting line and stay wires which are indicated at 4, 5 respectively in Figure 1.

The lock formers of the series are the same in every respect and consequently only one need be described.

Each lock former (Figures 3, 3a, 5, 10, etc.) comprises a carrier which consists of a box-like casting of angular form, one arm 6 of which is arranged to lie substantially at right angles to the table while the other arm 6ª is arranged at an angle to the arm 6 and is preferably arranged at an angle thereto in the neighbourhood of 130 to 135 degrees so that the staple which is formed in the arm 6ª is fed into a die for forming the wire lock 18 at an angle preferably in the neighbourhood of 40 to 45 degrees, it being understood of course that the arrangement of these parts need not necessarily be as thus described.

The die is constituted by a fixed part 7ª and a movable part 7ᵇ (Figures 26 to 29) which are located at the juncture of the said arms, the die part 7ª being connected to the arm 6ª and the die part 7ᵇ carried by the arm 6.

The connection between the carrier and the table 2 is preferably such that the carrier may be readily adjusted so as to secure any desired spacing between adjacent carriers according to the desired spacing apart of the line wires.

The arms 6, 6ª are adjustably connected at their ends to bars 150 which are connected to the sides of the table 2 and are formed with slots 8 arranged at suitable intervals apart, for example one-half or more inches, so that the carrier may be detachably secured to the table as by means of removable keys 9 and are capable of being readily adjusted to any particular spacing apart thereof which may be required.

The means for forming a staple and feeding it into the die (Figures 6, 8, 9, 12, 13) is carried in the arm 6ª of the carrier and comprises slides 11, 12 the slide 11, in conjunction with an anvil 13 which is adapted to be reciprocated intermittently in a horizontal plane, being adapted to form the staple 10 whereupon the other slide 12 which is located at one side of the slide 11 and is adapted to be moved past the anvil, after the slide 11 has been moved so as to form the staple around the anvil, is operated so as to force the formed staple into the die parts 7$^a$, 7$^b$. The means for operating the slides referred to and also the anvil will be described later.

The face of each fixed die part 7$^a$ (Figures 26 to 29) adjacent the slide 12 is formed with an inclined slot 14 which extends through this die part in alignment with the slide 12. The co-operating faces of the two die parts 7$^a$, 7$^b$ are formed with grooves 15, 16, arranged at right angles to each other and adapted to accommodate the stay and line wires respectively and other grooves 17 are formed in the faces of the co-operating die parts, which grooves are so shaped and arranged that when a staple is introduced into the closed die it is bent around the intersecting line and stay wires so as to produce the wire lock 18 which connects the stay and line wires together.

The movable die parts 7$^b$ are connected to slides 19 (Figure 11) which are arranged for sliding movement within the arms 6 of the carrier units and said slides are arranged to be operated in series and in unison by a bar 20 (Figure 3a) which may be arranged to operate in a line at right angles to the slides 19 and is preferably arranged to act in tension, said slides 19 being actuated from the bar directly or through intermediate means, as for example through the medium of adjustable connecting rods 21, the connection between these connecting rods and the slides 19 preferably consisting of pins 22 which are adapted to shear under excessive strain and thus prevent damage to the operative parts.

The slide 11 for forming the staples is operated by means of a toothed bar 23 (Figure 3a) which is arranged in a plane parallel with the aforesaid bar 20 and may be adapted to operate directly upon the plungers 11 at the appropriate moments or may actuate the latter through intermediate mechanism similar to that previously described with reference to the die plungers.

The slides 12 for forcing the formed staples into the respective dies are arranged to be operated by means of the bar 159$^a$ to which they are connected by means of the adjustable links 159$^b$, said bar and also the toothed bars referred to being arranged to be operated by means of cams which will be described later.

In the case where the toothed bars or racks 23 are arranged to operate directly upon the die and staple forming slides it is preferred to provide toothed sections 24 for operating such slides, said sections being connected to a plain operating bar by means, for example, of pins which are adapted to shear if excessive strain is imposed upon the parts and so prevent damage thereto.

The wire for forming the staples is indicated at 25 (Figures 4 and 34) and is fed from suitably located reel holders, to be described later, into the position for operation upon by the staple forming slides and means are provided for guiding the staple wire into this position and for cutting predetermined lengths of the wire in succession as it is fed, the cutting operations being effected in advance of the staple forming operation or they may be arranged to be effected partially in advance of the staple forming operation and partially simultaneously with the commencement of the staple forming operation as by forming the front edge of the slide 11 with a cutting edge which, upon movement of the slide, is brought into shearing relation with a bushing 27 through which the wire is fed into the staple forming mechanism.

A strip of staple wire severed so as to form the staple is indicated at 10$^a$ in Figures 6 and 7 and such piece of wire is arranged to be supported at three points constituted by the top edge of the slide 11, the front edge of the bush 27 and a recess which is formed in one side of a spring controlled plunger 10$^b$ carried by the slide 11.

In practice, however, I may arrange for the staple wire to be supported at five points constituted by the said anvil, a part of a fixed support 11$^b$ (Figure 10) for the said slide 11, the forward edge of the latter, the forward edge of the bush 27 and the inner side of said spring controlled plunger 10$^b$.

The means for feeding the staple wires (there being of course a series of lengths of staple wire fed into the series of lock formers) may comprise a crank operated toothed bar or rack 28 (Figures 30 to 33) and a series of toothed slides 29 intermeshing with said rack, each of said slides carrying a gripping or friction clutch device 30 consisting for example of three or more balls 31 (tempered if necessary) arranged in a hardened tapered sleeve 32, the staple wire being passed between such balls and adapted to be gripped and fed by the latter upon actuation of the slides 29. A similar series of locks or friction devices is arranged above the aforesaid locks and in line with the feed of the staple wires (which are preferably fed in a vertical direction) and adapted to grip and hold the wires during the return stroke of the slides 29, such other series of locks or friction clutches being indicated at 33 in Figure 31.

The internally conical sleeve 32 may be secured in position by a grub screw 32$^a$ and axial movement of the tubular member 30 is permitted by adjustment of a screwed plug 32$^b$. By slacking back this plug, for example, and having reference to the position of the parts, as illustrated in Figure 31, the member 30 would be free to move upwardly thereby permitting outward movement of the balls. Such adjustment of these parts would permit the passage of wires of different thicknesses through the clutch mechanism. The extent of movement of the member 30 would be limited by the position of the plug 32$^b$.

The crank for operating the bar 28 is indicated at 34 (Figure 34) and the length of the staple wire feed or movement of the slides 29 may be adjusted by adjusting the radial position of said crank.

Preferably the staple wires are arranged to be supplied with lubricant as by means of rollers 35 (Figure 34) which operate in an oil tank 36 so that lubricant is conveyed by the wires of the parts of the machine for operating thereon which parts are thus lubricated.

As previously mentioned, the cut lengths of staple wire are formed into staples by the operation of the slides 11 in conjunction with the shaped anvils 13. The said anvils are arranged to be reciprocated across the path of the slides 11 as by means of eccentric pins 37 (Figure 9) which engage in the anvils and are carried upon a shaft 38 which carries a toothed wheel 39, said toothed wheel being arranged to be operated by means of a toothed rack or bar 40 (Figures 3, 3a), the arrangement and manner of operation of these parts being such that the anvils are withdrawn from their respective lock forming units when the staples have been formed in order to permit movement of the slides 12 which force the formed staples into the dies.

The slides 11 are formed with slots 11a (Figures 9 and 12) contiguous with the slots in which the staple driving slides 12 move and in the staple forming operation the anvils and the staple wires formed around the latter will be received in the slots 11a, the anvils being subsequently withdrawn from such slots leaving the staples ready to be driven into the dies by the subsequent operation of the staple driving slides 12.

In a modification (Figures 14 and 15) the bar 40 is dispensed with and the staple forming slide 11 is formed with a cam surface 40a adapted to operate a spring controlled plunger 13a carrying the anvil which plunger is also provided with a cam surface 40b.

In such a modification the cam surface at the front edge of the staple forming slide, upon movement of the latter, operates to push the plunger out of the slot 11a above referred to until the staple, forced by the driver slide 12, can pass the plunger, and, acting on the bevel 40b of the latter, pushes the plunger completely out of its path.

Referring to the feeding of the line wires and stay wires through the machine, this is effected in the case of the line wires by grippers which are carried upon an overhead rotary drum 42 (Figures 1 and 2) and in the case of the stay wire by means 43 (Figure 1) which operates to cut off predetermined uniform lengths of stay wire from a reel of wire and feed the severed lengths in succession directly within the dies, the line wires being arranged in the machine at the required distances apart and passed between the dies and a stay wire fed between the dies and across the line wires prior to the formation of the staples as will be understood from the above description.

The line wires are drawn from reels, to be described later, and are led from the latter through tubular guides which lead the wires beneath the base of the machine and the lengths of wire after leaving such tubular guides are preferably led through a series of devices which operate to impart a helical form to the wires producing a helical effect in the finished fabric.

The series of coilers may conveniently be disposed immediately behind the staple wire feeders and comprise vertically disposed series of rollers 44 (Figures 34 to 38), and the rollers of each series are disposed in staggered relationship and preferably have their axes relatively inclined to each other as is illustrated in these figures.

The rollers are carried upon supports 45 which are preferably rotatably mounted so that they may turn freely during the coiling operation and remain stationary during the time the wire locks are being formed. Provision is preferably made, however, for applying a tension effect such as will take any slack out of the wires immediately prior to the clamping of the wires by the dies so as to ensure that the spacing of the portions of the line wires between adjacent stay wires is uniform.

Means may also be provided for varying the degree of staggering of the coiling rollers so that it is possible exactly to control the coiling of the line wires. Such means may comprise a worm 46 and toothed segment 47 engaging with the worm and associated with one or more of the rollers of the series so that by the operation of said worm and segment the angular position of the rollers associated with the latter may be varied as desired.

I may arrange for the series of coilers to be rotated positively, as by means of a light chain drive, although normally rotation of the coilers will be effected by the pull of the line wires as they are fed through the machine.

The intermediate coilers may be displaced from the centre line relative to the end coilers, preferably in a position towards the movable dies, so that a spring-like action is imparted to the combined wires 4, 5 upon opening of the dies after a lock forming operation tending to throw the locked intersections of the fabric out of the fixed matrices. This arrangement of the end coilers also facilitates the threading of the stay wires across the line wires in the preferred manner according to which the stay wires are passed behind the margin wires 4a and in front of the intermediate line wires or vice versa while deflector plates may be provided and arranged so as to ensure this relative dispositioning of the line wires and facilitate the threading of the stay wires in the manner referred to.

The line wires are held by the grippers 41 on the overhead drum and the latter is arranged to be rotated after a portion of the fabric has been completed in the lock formers so that the grippers operate to move the fabric forward into position for the next forming operation. The grippers are arranged in series annularly around the circumference of the drum and the arrangement is such that the series of grippers (which, as shown, comprise pairs of jaws) are brought into operation such that they grip the line wires succesively during rotation of the drum and the arrangement is preferably such that more than one series of grippers on the far side of the drum relative to the feeding side of the machine are in operation at a time.

Referring to the overhead drum 42, the grippers thereon comprise jaws 41a, 41b, and the jaws 41a are adapted for lateral movement towards or away from the jaws 41b and are actuated by radial arms 48 (Figure 40), the inner ends of which carry rollers 49 which engage a cam 50 which is secured to the housing 51 for one end of the shaft 52 which carries the drum, the arrangement being such that as the drum is rotated the said rollers are moved so as to engage the high and low parts of the cam. When the rollers are in engagement with the high part of the cam the jaws 41a are moved into gripping relation with the jaws 41b as through the operation of links 53 and upon the rollers subsequently arriving in succession at the low part of the cam, the jaws 41a are moved out of gripping engagement with the jaws 41b and with the line wire, such latter movement being arranged to take place automatically if desired as by the operation of springs 54 which are energized upon movement of the arms to close the jaws.

The grippers are thus arranged in spaced lines around the outer surface of the drum 42 and the gripper jaws are movable in a direction lengthwise of the drum and crosswise of the fabric.

The gripper jaws are preferably adapted so that they may be adjusted so as to meet any particular spacing apart of the line wires and this adjustment may be effected by providing spacing members 55 (Figure 42) which are adapted to be interposed between adjacent pairs of gripper jaws and are of lengths chosen in accordance with the particular spacing required. Means may also be provided for adjusting the distance between the gripper jaws so that the allowance made for movement of the latter is only such as will ensure an efficient gripping action of the jaws on the wires, such means preventing excessive transverse displacement of the jaws as would put them out of alignment with the stay wires for a succeeding rotary movement of the drum.

Referring further to the drum 42 and the grippers thereon and with particular reference to Figure 1, means are preferably provided and adapted positively to locate the line wires in the grippers. Such means is indicated at 110ᵃ and consists of a metal plate rotatably connected with the sprockets 110, said plate being preferably arranged to operate upon the line wires of the fabric as each successive line of grippers reaches the line of first contact of the fabric with the drum 42. The said plate is also arranged to operate upon the line wires so as to push same between the gripper in advance of the gripping movement of the jaws.

The foot pedal 60 may have a latch member 60ᵃ associated therewith and adapted to hold the pedal normally in a position in which the rod 63 maintains the drum segments in their extended positions.

The fabric is led away from the drum 42 to a winding drum 56 (Figure 2), said winding drum being preferably located in a position where the lengths of line wire extending from opposite sides of the overhead drum 42 assume positions substantially parallel with each other.

The winding drum may be composed of a plurality of segments 57 (Figures 45 to 49) which are adapted to be supported upon tapered guides 58, the segments being provided with parts 59 which are adapted for sliding movement upon said guides. The mechanism for collapsing the drum comprises a foot pedal 60, rod 61, lever 62 and rod 63, the latter passing freely through the main shaft 64 which carries the tapered guides, and being connected at its outer end with the outer and free end of the winding drum segments.

Axial movement of the said rod in one direction will thus effect expansion of the drum while movement of this rod in the opposite direction will effect contraction of the drum.

The winding drum is preferably arranged to be driven by a motor which may be an electric motor as indicated at 65 (Figure 2) which operates so that its speed decreases as the torque resistance of its load increases as the roll of fabric increases in size; and this motor may have a switch connection to the main clutch operated rod 66 (Figure 1).

Referring to the feeding of the stay wire lengths, this is effected, when the dies are open, by means of rollers 67 (Figures 51 and 53) located at one side of the series of lock formers. Preferably, and as shown in the drawings, two such rollers are provided and one of them is spring controlled in such manner that it cooperates with the other roller, which is fixed, such that sufficient frictional contact is secured as will cause the stay wire to be taken up by the rollers 67 and fed across the line wires. Said spring control for one of the feeding rollers is indicated at 68, this roller being carried by a shaft 68ᵃ which is connected to the machine frame by means of a ball bearing 68ᵇ which has an outer race 68ᶜ of spherical form. The roller and its carrying part is thus permitted a slight radial movement about the centre of the said bearing.

This arrangement of feed rollers whereby the space between them may be automatically adjusted prevents any flattening of the stay wires by the rollers and enables the wires to be taken up readily by the rollers. The feed rollers are preferably arranged to be driven by the means for rotating twister mechanism for the margin wire located at this side of the machine, the said twister mechanism operating to twist this end of the stay wire around the margin wire, another twister being provided at the other side of the machine (or intermediate the extreme sides of the machine in the case where the machine is adapted to form more than one width of fabric at a time) for twisting the other end of the stay wire around the other margin wire.

Referring to said twister mechanism, same comprises a rotary spindle 69 (Figure 52) having a coiling head 70 and formed with axial bores 71, 71ᵃ, 71ᵇ which permits of the passage of the margin wire 4ᵃ therethrough. In conjunction with the marginal twisters there is provided a member 72 which is adapted to be reciprocated over the ends of the stay wire, said members (one being provided at each extreme side of the machine) having a bevelled edge 72 which, upon engaging the ends of the stay wire, causes same to come into the path of the twisting hook 74 of the twister.

The worm 71ᵈ is keyed (as indicated at 71ᵉ, Figure 52) to the twister spindle 69 and gear wheel 71ᶜ is carried upon a tapered sleeve 71ᶠ (Figure 53) which sleeve is carried on the shaft 152, said sleeve having an enlarged end 71ᵍ and being screw threaded at its other end 71ʰ where it carries a collar nut (71ⁱ) having notches 71ʲ around its flange. The said collar nut is also illustrated in Figure 55. Tightening of the nut 71ⁱ clamps a ball bearing 71ᵏ against a distance piece 71ˡ and the latter against the gear wheel 71ᶜ which is tightened upon the tapered sleeve 71ᶠ. Loosening of the collar nut enables adjustment of the angular position of the twister spindle and the gears 71ᶜ, 71ᵈ relatively to the driving shaft 152 so that the twisting hook 74 may take up the end of the stay wire at the moment when it is forced down by the shoulder (bevelled edge) 73 on the finger (member) 72. This means of adjustment enables exact timing of the twisting operation under all conditions.

The said members 72 are adapted to be reciprocated by means of a toothed bar or rack 75 which engages a toothed portion 76 carried by the members 72, which latter are formed at their ends with a form 77 (Figure 53) which is arranged so as to receive the margin wires therein and serves to prevent any tendency for the latter to be pulled sidewise or endwise of the stay wire. The position of the stay wire feeding rollers 67 in relation to the twister heads 70 is such as to permit the marginal fingers 72 to push the stay wire directly down on to the rotating twister head so that the ends of the stay wire assume an inclined position as indicated in Figure 55, and the amount of stay wire coiled around the marginal wires is mainly determined by the position of said feeder rolls. This inclined positioning of the ends of the stay wires is facilitated by means of plates 78 (Figure 54) which are fixed in position and are operated in conjunction with plates 79 which are fixed to the marginal fingers, the plates 78 being formed with an inclined slot 80 and the plates 79 with a slot 81 which normally is in alignment with the slot 80 so that the stay wire may be passed through the pairs of slots but, upon reciprocation of the marginal finger plate and consequent reciprocation of the plates 79, the ends of the stay wire are carried forward and move downwardly in the slot 80 which they subsequently leave.

As above mentioned, stay wires are arranged to be fed directly between the lock forming dies and this may be accomplished by arranging for the stay wires to be fed in a transverse direction across the line wires and providing guides which are arranged between the adjacent lock formers, the stay wires being fed through such guides and the latter being preferably adapted so that they guide the wire in a line slightly in front of the fixed die parts and in a plane corresponding substantially with the cross groove 15 and the central horizontal plane of the pairs of dies.

Figure 23:
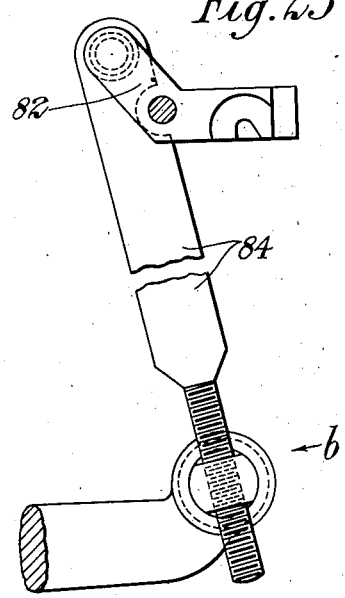
Figure 23 is a detail view of the upper stay wire guide and its operating mechanism which are partly illustrated in Figure 4.
Figure 24:
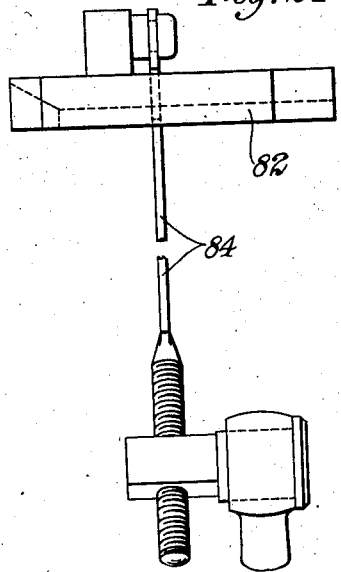
Figure 24 is a view of Figure 23 looking in the direction of the arrow $b$.

The said guides may comprise upper and lower parts 82, 83 (Figures 23, 24, 4, 3 and 3a), the lower parts being fixed and the upper parts movable as by cam or otherwise operated lifters 84 (Figures 4, 23 and 24), this movement of the upper guides permitting the stay wire to be pushed by the intermediate line wires against the fixed die parts when the movable die parts are actuated to close the dies, in which position of these parts the wire locks are affixed at the points of intersection of the intermediate line wires and a stay wire.

Figure 3:
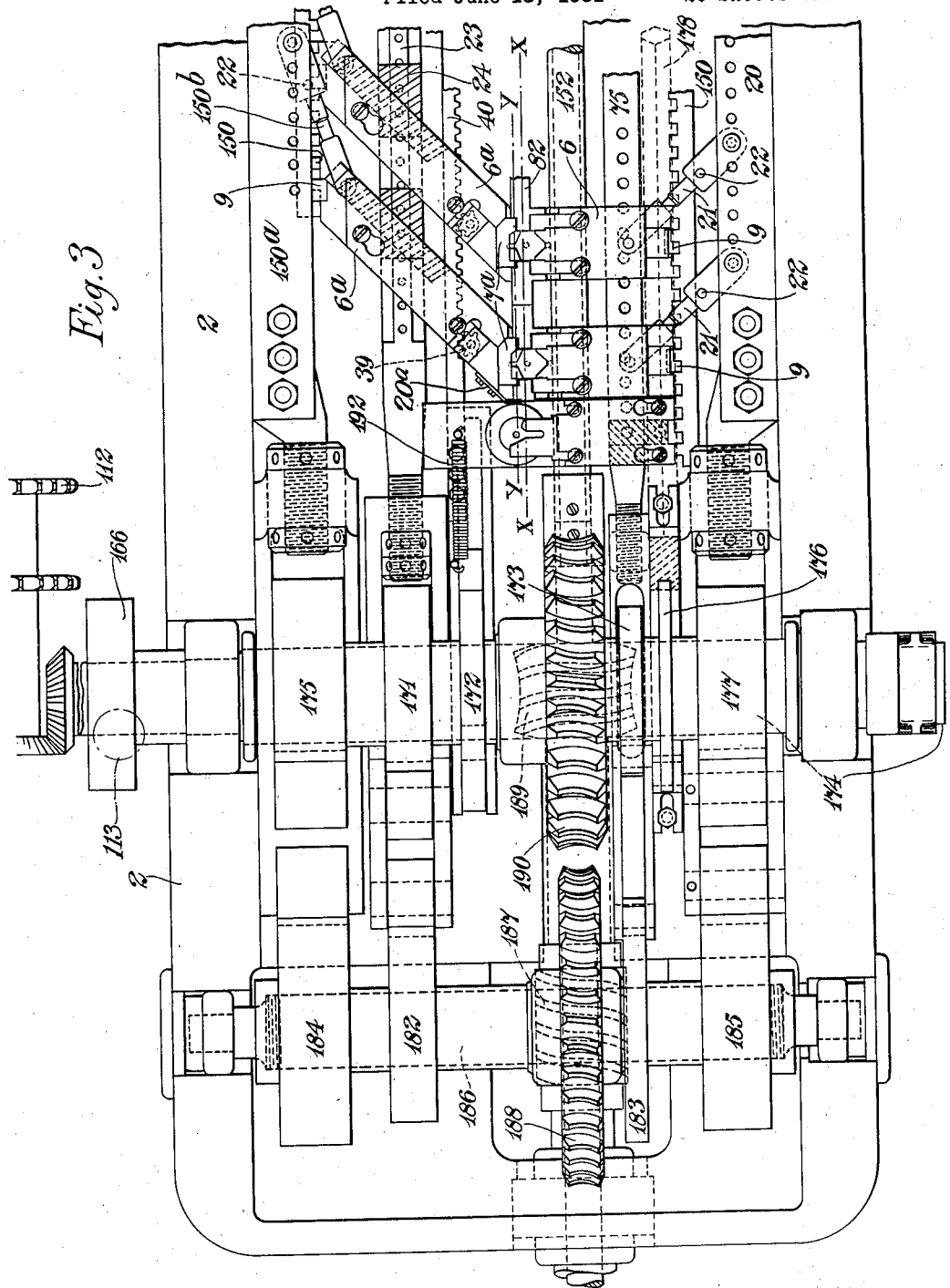
Figure 3 is a fragmentary plan of the mechanism for operating the dies, this figure also illustrating the right-hand twister.
Figure 26:
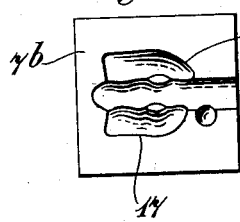
Figures 26, 27, 28 and 29 are detail views illustrating the dies.
Figure 27:
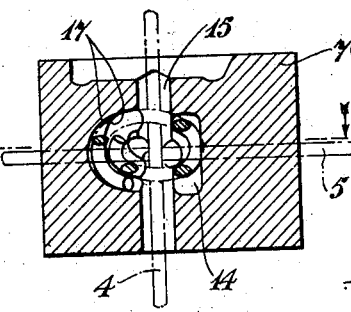
Figure 25:
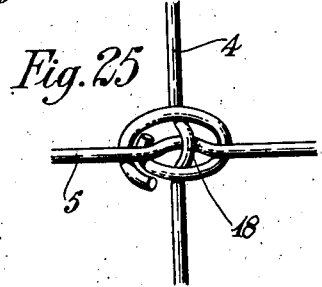
Figure 25 illustrates the form of interlock produced by the machine according to this invention.
Figure 28:
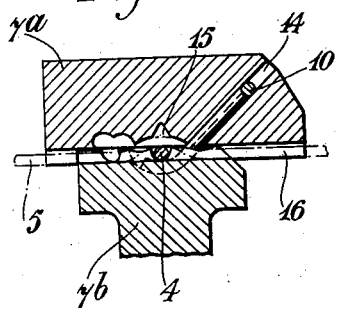
Figure 29:
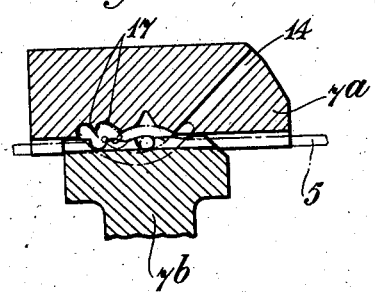

The arrangement of the guides 82, 83 for the stay wire relatively to the bores 71, 71a, 71b of the marginal twisters is such that when the stay wire is fed into position within the dies it assumes a position with its ends between the marginal wires and the next intermediate line wires and when the dies are open the stay wire is positioned at a short distance in front of the faces of the fixed dies, this initial position of the stay wire being substantially as indicated by the line X—X (Figures 3 and 3a). When the dies are closed the stay wire and the line wires are moved (the movable die parts 7b making contact with the line wires) towards the fixed dies and assume a position substantially as indicated by the line X—X and the combined wires will spring back into their original positions when the dies are subsequently opened. The closing of the movable die parts may constitute the sole means of moving the stay wires from their initial position within the die parts to their locking position in which the wire locks are applied.

Referring to Figure 4, there is shown a member 20a disposed above the fixed die parts and arranged to intersect the plane of the fabric, said member having a cam or like surace 20b which is arranged to overlie the locking position of the stay wires within the dies and serves to bear against the stay wires of the fabric as same are successively moved away from the dies, said cam surface causing the fabric (including the line wires) to be moved away from the fixed die parts into a position beyond and clear of the feed line of the next succeeding stay wire.

A member 20a, which is also shown in Figure 3, in practice is used only at the dies or twisters adjacent each margin wire, because the margin wires do not move back in the same way as the line wires and force is required to spring back the portions of the woven stay wire between the margin wires and the adjacent line wires so as to ensure that the next succeeding stay wire may be fed between the margin wires and the line wires.

The wire for forming the stay wires may be arranged to be fed through a tubular guide 85 (Figure 1) to the said rollers 67 and mechanism is provided which operates upon the length of wire as it is drawn from its reel or holder so as to cut the wire into any required predetermined and uniform lengths which are thereafter taken up by the said rollers 67 and fed in succession into the weaving position within the dies. Such feeding mechanism for the stay wire consists essentially of a pair of endless chains 86, 87 (Figures 59 to 68) which are arranged one above the other such that the chains are adapted to coact with one another so as frictionally to grip the stay wire and feed it into the said tubular guide which is shaped so as to lead the severed lengths of said wire to a point where they may be taken up by the said rollers 67.

The said chains are supported by sprockets 88, 89 which are adapted to be driven in unison from any convenient power source. The chains may be similar in construction and, in the particular example illustrated, each chain consists of a series of links 90 which are flexibly connected together with their ends overlapping and the links of the upper chain are formed with grooves 91 so that there is formed a longitudinal groove in the peripheral surface of this chain and the links of the other chain are formed with projections 92 so that a longitudinal projection is formed on the peripheral surface of this chain which is arranged to co-operate with the longitudinal groove in the other chain to form a closed recess in which the stay wire is accommodated and fed by the frictional gripping of the wire by these parts of the chains.

Means are provided in association with said chains which is adapted to cause the chains to press tightly against and frictionally engage the wire so that upon movement of the chains through this active zone the said wire will be fed continuously towards the rollers 67 at a speed substantially equal to the peripheral speed of the chains. Such means comprises a weighted member 93 which is adapted to bear upon the upper surface of the lower run of the upper chain and the degree of pressure exerted by this member is controlled by a spring 94 and nut 95 which is mounted upon the screw rod 96. Said screw rod is formed with a part 97 which is slotted at 98 in which there is accommodated a pin carrying a link 99 which has a pivotal connection with said groove and with the pressure member 93, another link 100 being pivotally connected to the end of the part 97 which link is also pivotally connected to the other end of the pressure member 93. Said links are formed with feet 101 (Figure 60), the projecting ends of which tend to exert a pressure upon the member 93 and the degree of pressure exerted can be adjusted by operation of the adjusting mechanism above referred to.

The upper run of the lower chain is adapted to be supported by means of a part 102, this latter part, together with the hubs of the sprocket 88, carrying a part 103 which are adapted to support each link at a point where a cutter (to be described later) operates to sever the stay wire and ensures that the links are properly supported so that they must travel in a straight line until they are taken up by the left-hand sprocket 88.

One of the principal functions of this mechanism consists in cutting the said wire into predetermined and uniform lengths and this is accomplished by means of a cutter 104 (Figures 64 and 65) which is carried in one of the links of the upper chain and is adapted automatically to be propelled outwardly at an appropriate moment, the cutter being arranged for example so as to be projected into cutting position by the action of the sprocket teeth (see tooth 105 in Figure 60) of the left-hand sprocket wheel 89 during movement of the chains so as to sever a length of wire from the main stay wire.

The arrangement and operation of the above parts is such that the chains operate to feed uniform lengths of stay wire at a speed consistent with the required speed of operation of the fabric forming machine without stopping the feed of the stay wire.

The rollers 106 (Figure 59) operate to feed and straighten the stay wire to the chains. The severed lengths of stay wire as they leave the guide 85 are taken up by the rollers 67 previously described and the speed of rotation of these latter rollers is preferably chosen such that they have fifty per cent. greater peripheral speed than the rate of feed of the chains, the rollers 67 being arranged to be driven synchronously with the fabricating mechanism so that the delivery of the stay wires across the line wires is correctly timed, according to the position of the cutter 104, with the intermittent feed of the line wires and the operation of the wire lock formers.

The stay wire may be cut into any required predetermined lengths by simply varying the lengths of the feeding chains 86, 87 and adjusting the distances between the sprocket wheels 88, 89 accordingly and also the distances between the actual cutting zone and the take-up feed rollers 67, the latter measurement being conveniently slightly less than each stay wire length.

The mechanism for driving the chains comprises gearing 153, 156, 157 (Figure 70), chain 158, which is connected between the sprocket wheel 157 and another sprocket wheel 159 (Figure 1), said latter wheel being carried upon a shaft 160 which also carries a bevel wheel 161 (Figure 63) which drives the left-hand sprocket of the upper chain through the bevel wheel 162 which is carried upon the shaft carrying said chain sprocket wheel. The lower chain is driven by means of the gear wheel 163 which is carried upon the shaft carrying the left-hand sprocket wheel of the lower chain and meshes with the bevel wheel 162.

When the apparatus is adjusted so as to vary the length of the stay wire lengths the gear wheel 153 (Figure 70) is also changed and the arrangement of this gearing is preferably such that the number of teeth on the gear wheel 153 represent in inches, or any other desired measure, the length of stay wire which is required to be fed into the machine, each tooth on the wheel representing a unit measure of the length of wire. The gear wheel 156 is carried upon a radius arm 164 which is pivotally connected upon the shaft 165 carrying the gear wheel 157 and permits the ready replacement of the gear wheel 153 by a different size wheel.

The stay wire feeding mechanism which is indicated generally at 43 (Figure 1), as shown in that figure is arranged within the width of the machine and provision is made whereby this mechanism may be adjusted into any desired position relatively to either side of the machine. The tubular guide 85 is also disposed within the width of the machine and is shaped so as to deliver the length of stay wire in a transverse direction at one side of the series of lock formers so that the severed stay wire lengths may be taken up in succession by the rollers 67 and fed directly between the lock former dies.

The tubular guides 85 may be adapted so that they will accommodate two or more severed lengths of stay wire and the separate lengths in such an arrangement would be fed to the rollers 67 by the action of the following severed length or lengths pressing thereagainst.

The arrangement of the said tubular guide and the stay wire severing and feeding mechanism is preferably such that the operations of these parts can take place within the normal width of the machine. The said tubular guide serves to reverse the direction of feed of the stay wire delivered from the severing and feeding mechanism referred to, and for this purpose may be formed with a bend of semicircular form as illustrated in Figure 1 of the drawings.

While the above described feeding and severing mechanism is particularly adapted for use in conjunction with the improved machine for producing wire fabric it is to be understood that such mechanism may be employed with equal advantage in other cases where a supply of successive lengths of wire of any predetermined and uniform length is required.

The overhead drum 42 which carries the grippers 41 for advancing the line wires as the fabric is formed is arranged to be rotated continuously by means of a chain 107 (Figure 2) which passes around guide sprockets 108, 109, 110, 111 and is driven by the sprocket wheel 112 and in order to compensate for the period during which a stay wire is being secured to the line wires it is arranged that the drum 42 is lowered while the dies are closed to complete the locks and is subsequently raised when the dies are opened after the forming of the locks, the drum being moved during this period through appropriate distances according to any desired spacing apart of the adjacent stay wires on the finished fabric. This raising and lowering motion of the drum may be effected by arranging for the drum to be supported by a structure 113 which is adapted to be operated upon by cams 166 (Figures 3, 3a) at appropriate moments during the operation of the machine so as to impart the necessary up-and-down motions of the drum, the sprocket wheel 108 carried by the movable structure 113 serving to take up the slack of the chain resulting from the drop of the structure 113.

The cam 50, over the surface of which the rollers 49 for operating the grippers 41 roll, may be secured to the supporting structure 113 so as to secure the cam against rotation. The drum 42 is of a diameter which prevents any tendency for the helical coiling of the line wires to be destroyed while the provision of this drum makes it necessary to employ only a single transfer means for the fabric to the final winding drum.

The circumference of the drum is a multiple of the unit of measurement of the fabric and serves to measure the latter.

The drum has associated therewith means adapted to record the amount of fabric fed thereby which recording means is associated with means adapted to cause an alarm to be sounded when a predetermined amount of fabric has been fed by the drum.

Referring to Figures 71 to 75 said alarm and recording means is shown operated from the chain sprocket wheel 108 through gearing 114, 115, 116, 117, the gear wheel 117 operating to rotate a drum 118 with which the alarm mechanism is associated while said wheel 117 is also associated with mechanism adapted to record the total amount of wire fabric produced by the machine, said latter mechanism being operated from the gear wheel 117 through pinions 119, 120 and worm 121 and gear wheel 122.

The recording mechanism which is indicated generally by the reference 123 in Figure 73 comprises an outer drum 124 having numbers on its peripheral surface (see Figure 74) which represent the total amount of fabric produced by the machine and which will be indicated by a pointer 125.

The face of the drum 118 is marked with radially disposed series of denominations 128 which represent a definite amount of fabric and the peripheral face of the drum is provided with laterally displaced contacts 126 arranged in line with the series of contacts representing the various denominations, said contacts being arranged so that upon movement of the drum through a certain distance one or the other thereof will contact with a fixed contact 127 whereupon an electric circuit is closed and an alarm or signal device is operated.

In the actual machine in operation the denominations on the drum represent the length of fabric in rods and the arrangement is such that if, for example, the alarm is to be operated upon 10 rods of fabric being produced, upon the contact 129 on the drum coming against the fixed contact the electric circuit will be closed and the alarm operated. The other contacts on the edge of the drum and indicated by the references 130, 131, 132 correspond with the denominations 20, 30, 40 respectively.

In the particular machine illustrated same is adapted to form two separate lengths of wire fabric and this involves the provision of twisters intermediate the ends of the machine which operate to sever the stay wire and twist the severed ends around the adjacent line wires 4ª of the two pieces of fabric.

The intermediate twisting mechanisms are illustrated in Figure 3ª and in detail in Figures 57 and 58 and are similar in construction and operation to the twisting mechanism above described and employed for twisting the outer ends of the stay wire so that similar parts of the intermediate twisting mechanism are indicated by the same references as have been used in describing the other twisting mechanism. The intermediate twisting mechanism, however, has associated therewith a cutter 166ª which is pivoted at 167 and is operated by an adjustable connecting rod 168 connected to the toothed bar 76 (Figure 52) which operates to move the fingers 72 into the path of the stay wire, said movable cutter operating in conjunction with a fixed cutter 166ᵇ, both of which cutter elements are supported by a cover 166ᶜ so that the cutter support is maintained in alignment for various adjustments of the distance between the centre twister spindles, such latter adjustment being effected by means of the screw bolts 166ᵈ.

The stay wire when initially positioned within the dies is guided in addition to the fixed and movable guides above referred to by means of a guide 169 which is arranged between the intermediate twister mechanisms and is slotted to permit of the passage of the cutting edge 170 of the cutter so as to sever the stay wire.

The toothed bars 23, 40 and 75 for actuating the staple forming slides 11, the anvils 13 and the fingers 72 of the twisting mechanisms are arranged to be operated by means of cams 171, 172 and 173 which are carried upon a shaft 174 which is driven from the main driving shaft 152. The shaft 174 also carries cams 175, 176 and 177 for operating the bar 150ª, a hexagonal bar 178 which actuates the movable stay wire guide parts 82 and the bar 20 respectively. Said shaft also carries one of the cams 166 for operating one of the structures 113 for supporting the overhead drum, the other cam 166 being located at the other end of the machine and driven by a shaft 179 which is driven from the main drive shaft 152 (Figure 70).

The said cams are arranged to operate in grooves formed in the blocks 180, to which the bars are adjustably connected, and rollers 181 are provided near one end of such blocks against which rollers the cams operate to move the bars in the direction indicated by the arrow at the right-hand side of Figures 16 to 21, movement of the bars in this direction causing the operation of the various parts with which they are associated so as to connect a stay wire to the line wires and the arrangement of the cams is such as will ensure the operation of the bars in the required sequence as will be described later.

For the purpose of returning the bars to their normal and inoperative positions other cams 182, 183, 184 and 185 are provided and carried upon a shaft 186 which is arranged to be driven from the main drive shaft through a worm 187 and gear wheel 188. The shaft 174 carrying the other cams is rotated in a clockwise direction by means of a worm 189 and gear wheel 190 while the other cam carrying the shaft is rotated in an anticlockwise direction, the respective shafts being provided with right- and left-hand worms as shown in Figure 3.

The cams 182, 183, 184, 185 are arranged in line with the cams 175, 171, 173 and 177 respectively and are arranged so as to operate upon other rollers 191 carried by the blocks 180 so as to move the respective bars in the direction of the arrow shown on the left-hand side of Figures 15 to 21.

The cam 176 for operating the movable stay wire guides is stepped so that initially the cam operates to raise the guides just sufficient to permit the stay wire to pass and be guided to the central cross groove of the dies and thereafter the next step of the cam operates to open the said guides fully so as to permit the upward movement of the fabric, the guides being moved clear of the latter by the second operation of the cam 176. This initial operation of the cam 176 will be arranged to take place so as to partly open all the movable guides 82 simultaneously with the contact of the stay wire with the line wires as it is pushed forward by movable dies when the latter are being closed.

The bar 40 for operating the staple forming anvils is arranged to be returned automatically after the high part of the cam 172 has operated upon its roller 181 as by means of a spring 192 and the bar 178 for operating the movable stay wire guides may also be arranged to be returned automatically as by the action of a spring 193 (Figure 4).

The coils of wire used in the manufacture of the fabric are arranged to be carried by an arrangement of reels as indicated in Figures 76, 77 and 78 and which is so designed that the reels occupy the minimum amount of space while, at the same time, they are readily accessible. Referring to the above figures, the reels for the line wires are indicated at 133 and are arranged in pairs in either side of a pit 134 formed in the floor of the workshop or other place where the machine is installed and the reels for the staple wires are indicated at 135 and are arranged in pairs immediately above the pairs of line wire reels, the former being arranged with their axes horizontal and preferably downwardly inclined, as illustrated in Figure 78, and the staple wire reels having their axes vertically disposed.

The staple wire reels may be arranged to be supported upon brackets 136 carried by vertical supports 137 arranged around the bed 134 and said supports are connected by transverse bars 138 at the ends of which a frame 139 is connected which serves to support welding apparatus 140 which is adapted for movement along the said frame. The welding mechanism is employed for welding together the ends of the line and staple wires i. e. the ends of the wires of the used coils with those of the new coils. The welding mechanism is also employed to weld together the ends of the stay wire which is arranged to be supported by a reel 141 which is located at the end of the pit opposite to the machine, the stay wire being led from its reel to a capstan mechanism 142 which operates to feed the stay wire to the chain feed mechanism above referred to.

The line wires are led away from their respective reels through tubular guides and are arranged around a capstan drum 144 located in front of the machine and from which drum the line wires are led up through the lock formers.

The reels for the staple wires are preferably of the form illustrated in Figures 81, 82 and 83 and comprise skeleton covers 145 which prevent the coils of wire from flying out of their reels 135 and are adapted automatically to lock themselves in position when they are lowered on to the framework of their respective reels and automatically unlock themselves from the said framework when they are lifted as by the automatic operation of locking means 146 consequent upon the lifting of the movable covers by handles 147 provided thereon.

The reels for the line wires are preferably of the form illustrated in Figures 79 and 80 and comprise a bell-shaped framework 148 forming a reel over which are threaded the coils of wire which have to be unwound. A shaft 143 journalled at the axis of the reel by bearing 143$^c$ is rotatably supported on a bracket 143$^d$ by means of a swivel thrust bearing 143$^e$. The arrangement is such that the shaft while free to rotate relatively to the bracket 143$^d$ or to the reel 148 prevents any axial movement of the reel but permits it by the swivel action of the bearing 143$^e$ to be raised or lowered away from or towards a stationary ramp 143$^f$. The said ramp is preferably mounted in a pit or depression in the floor on which the apparatus is carried, the upper end of the ramp being at the floor level so as to facilitate the assembly of the coils of wire. The inner end of the reel 148 is arranged to project beyond the ramp 143$^f$ and is flanged at 143$^g$ to form a stop. By this arrangement the coil being unwound is located axially in a position in which it clears the ramp. The end of the shaft 143 which passes through the bearing 143$^e$ is formed with an axial bore 143$^a$ and a radial opening 143$^b$ communicating therewith while a radial arm 149 formed at its outer end with an eye 149$^a$ is secured on the shaft in the same axial plane as the said opening and rotates adjacently to the flanged end 143$^g$ of the reel 148. In their normal operating position the shaft and reel lie at a slight inclination to the horizontal.

In the operation of the above described reel a coil of wire is first placed and then passed over the reel by which latter it is roughly centred. The outer end of the reel is supported by the ramp either directly or indirectly by other coils placed in position upon the reel and resting upon the ramp. The free end of the coil is threaded through the eye 149$^a$, the opening 143$^b$ and the bore 143$^a$. From thence it is drawn, as required, by the operation of the grippers on the overhead drum 42. As the wire is drawn off the coil the bight or portion between the coil and the opening 143$^b$ travels round and round the stationary coil. As it does so it engages the arm 149 at the eye 149$^a$ and carries this arm around with it thereby turning the shaft 143 and maintaining the opening 143$^b$ substantially opposite to the point at which the wire is unwinding from the coil. Without the provision of the arm 149 the unwinding wire would wrap itself around the shaft 143, the said shaft being required to maintain the axial position of the reel and coils carried thereby. It is intended while the unwinding of one coil is in progress that one or more further coils should be placed on the reel adjacent to the coil which is being unwound and that the starting and finishing ends of each coil should be welded or otherwise joined together so that wire may be fed from the reel in a continuous length. It is evident that the object of these reels, that is the uninterrupted supply of continuous lengths of wire, such as the line wires for the fabric, is thus achieved. By arranging that a coil shall be stationary during unwinding it is made possible to join the ends of successive coils without interrupting the process while the stationary reel having an unobstructed end enables a coil to be placed in position on the reel at any time ready for unwinding without interfering with the continuous unwinding of the coil already in position. In Figure 79 a pair of such coils is indicated by the reference 143$^k$, such coils being in position on the reel so that they may be slid down the latter and have their ends joined in succession to the end of a used coil on the reel.

The operation of the machine may be described as follows:—

The line wires 4 are first threaded upwardly through the coilers 44, the margin wires 4$^a$ through the twisters 71 and the intermediate line wires (4) through the lock forming frames between the dies and then passed between the grippers on the overhead measuring drum 42 and thence to the winding up drum 56 to which the ends of the line wires are secured.

The staple forming wires 25 are also inserted into the series of chucks 32, 33 while the stay forming wire 5 is taken up by the chain feeding mechanism 43.

Upon starting up of the machine the stay wire is severed by the cutter 104 and a length of wire is fed across the line wires directly into the stay wire guides 82, 83 and between the series of dies 7$^a$, 7$^b$, the stay wire being arranged between the line wires and the fixed die parts 7$^a$. With a stay wire so positioned between the die parts the movable die parts 7$^b$ are actuated to move the intermediate line wires and the stay wire from the feeding position X—X of the latter (Figures 3 and 3$^a$) to the locking position Y—Y in which latter position the dies are closed and the intermediate line wires and the portion of the stay wire in contact therewith (or between the marginal line wires) is offset from the marginal wires. The cam for operating the movable stay wire guides 82 is operated initially, simultaneously with or almost so with the movement of the movable die parts, so as to raise such guides sufficiently to permit the stay wire to be moved by the intermediate line wires bearing thereagainst by the action of the movable die parts, the said guides being subsequently raised into the fully opened position by further actuation of the said cam, when the stay wire has been affixed to the line wires, so as to permit upward movement of the formed fabric. With the line wires and a stay wire positioned in the closed dies as above described the staple forming slides 11, 12 are operated and the formed staples 10 forced by the slides 12 through the fixed die parts 7ª into the dies so that the staples straddle the stay wires at the point of intersection of the intermediate line wires with the stay wire and the legs of the staples follow in, and take the form of, the grooves in the dies, thereby completing the locks, the latter being formed simultaneously so as to secure the intermediate line wires to the stay wires. Simultaneously with the formation of the wire locks the twisters operate to coil the ends of the stay wire around the margin wires 4ª (the cutter 106ª of the intermediate twister mechanism having previously operated so as to sever the stay wire) in order to complete the weaving of the fabric whereupon the dies are opened (the movable die parts 7ᵇ being immediately moved away from the fixed wire parts 7ª) and the drum 42, which rotates continuously, is then able to take up the fabric by the operation of its grippers, the woven fabric being ultimately wound upon the winding drum 56, the operation of the staple wire feeding mechanism, the stay wire measuring and cutting mechanism, the stay wire feeding rollers 67 for the next severed stay wire and the staple and lock formers being subsequently operated again so as to weave another stay wire on to the line wire at any predetermined distance from the stay wire previously secured to the line wires.

Simultaneously with the operation of the lock formers and while a stay wire is held in the dies during this operation, the drum 42 is lowered and then the dies are opened and the drum is raised while the dies are open through appropriate distances in order to secure a cessation of the feeding of the line wires of the fabric by the grippers on the overhead drum, the latter being returned to its upper position while the dies are open after the securing of a stay wire to the line wires so that the grippers operate immediately to move the line wires the required distance for the securing of the next stay wire in the fabric, the operation of these parts proceeding automatically and in correct predetermined sequence by the operation of the cams (the operation of which cams may be timed according to any particular spacing of the series of wires which may be required) until the machine is stopped.

In one specific form of the invention the drum falls at a uniform speed from the time the dies are ⅜-inch from being closed until they are ⅜-inch from being fully open and during the rest of the open period of the dies the drum rises at a graduated or "crank motion" speed.

It is to be understood that the invention is not limited to the above details of constructions nor to the particular construction and operation of the machine and the combination of the different operating parts thereof may be varied according to any particular requirements or any practical or other conditions it may be desired to fulfil.

I claim:

1. In a machine for forming wire fabric, the combination of means for feeding line wires therethrough, means for feeding stay wires across the line wires, means for feeding wire to the machine from which wire-locks may be formed at the intersections of a stay wire with the line wires said wire locks being formed as closed loops engaging the stay and line wires on each side of the point of intersection of those wires and means embodied in the machine for forming said wire-locks and to which means the stay wires are fed directly and transversely.

2. In a machine for forming wire fabric, the combination of means for feeding line wires therethrough, means for feeding stay wires across the line wires, means for feeding wire to the machine from which wire-locks may be formed at the intersections of a stay wire with the line wires said wire locks being formed as closed loops engaging the stay and line wires on each side of the point of intersection of those wires, dies for forming said wire-locks, and means for supporting and directing the stay wires between the said dies.

3. In a machine for forming wire fabric, the combination of means for feeding line wires therethrough, means for successively feeding stay wires across the line wires, means for severing predetermined lengths of said stay wires from a single wire, means for feeding wires to the machine from which wires wire-locks are formed at the intersection of the line and stay wires said wire locks being formed as closed loops engaging the stay and line wires on each side of the point of intersection of those wires and means for forming said wire-locks and to which means said stay wires are fed directly.

4. In a machine for forming wire fabric, the combination of means for feeding line wires therethrough, means for feeding and severing predetermined lengths of stay wires and for successively feeding the severed lengths across the line wires and a line of dies for forming wire-locks at the points of intersection of the line and stay wires, said dies being fed with wire for the formation of the wire-locks and the said stay wires being introduced at one end of the line of dies and fed directly within the latter said wire locks being formed as closed loops engaging the stay and line wires on each side of the point of intersection of those wires.

5. In a machine for forming wire fabric, the combination of means for feeding line wires therethrough, means for continuously feeding wire, from which stay wires for the fabric are formed, longitudinally of itself and at a constant speed, means for cutting said stay wire into given lengths during feeding thereof, means for taking up the feed of each length of stay wire after same has been cut, said latter means being adapted to feed the stay wires at a higher speed than the initial feeding means therefor such that the lengths of stay wire are fed successively at predetermined intervals across the line wires and means for forming wire-locks at the intersection of the line and stay wires.

6. In a machine for forming wire fabric, the combination of means for feeding line wires therethrough, means for continuously feeding and measuring wire, from which stay wires for the fabric are formed, longitudinally of itself at a constant speed and for cutting said wire into given lengths without varying such measuring movement of the wire, feeding rolls adapted to grip the advance end of the length of stay wire immediately as it is cut, said rolls being adapted to feed each length of stay wire at a higher speed than that of its measuring movement for the purpose of producing intervals of the feeding of the successive lengths of stay wire so as to allow for the formation of wire-locks at the intersection of the line and stay wires, and means for forming said wire locks.

7. In a machine for forming wire fabric, the combination of means for feeding line wires therethrough, means for feeding and severing predetermined lengths of wire which lengths form the stay wires of the fabric, means adapted to feed said lengths of stay wire across the line wires at a higher speed than the initial feeding movement of the stay wire, a guide adapted and arranged so that the severed pieces of stay wire may be accommodated therein and one severed piece pushed into position for being taken up by said latter feeding means by the action of the wire behind it and means for forming wire-locks at the intersection of the line and stay wires.

8. In a machine for forming wire fabric, the combination of means for feeding line wires therethrough, means for feeding stay wires across the said line wires and means for forming wire-locks at the intersection of the line and stay wires and to which means the stay wires are fed, said means for feeding the stay wires comprising a superposed pair of endless chains, the adjacent plies of which are adapted frictionally to engage the wire between them.

9. In a machine for forming wire fabric, the combination of means for feeding line wires therethrough, means for feeding stay wires across the line wires and means for forming wire-locks at the intersection of the line and stay wires so as to join these wires together, said means for feeding the stay wires comprising a superposed pair of endless chains the adjacent plies of which are adapted frictionally to grip the wire between them, a groove being formed in the face of one chain so that the wire may be received therein and a tongue or projection being formed on the face of the other chain which tongue or projection fits into said groove and bears upon the wire therein.

10. In a machine for forming wire fabric, the combination of means for feeding line wires therethrough, means for feeding stay wires across the line wires and means for forming wire-locks at the intersection of the line and stay wires so as to join these wires together and to which means said stay wires are fed, said means for feeding the stay wires comprising a superposed pair of endless chains, the adjacent plies of which are adapted frictionally to grip the wires between them, means for driving said chains in unison and wire-cutting means forming a component part of said chains, said cutting means being constructed and arranged to be actuated at the point of exit of the stay wire from the chains.

11. In a machine for forming wire fabric, the combination of means for feeding line wires therethrough, means for feeding stay wires across the line wires and means for forming wire-locks at the intersection of the line and stay wires so as to join these wires together and to which means said stay wires are fed, said means for feeding the stay wires comprising a superposed pair of endless chains the adjacent plies of which are adapted frictionally to grip the wire between them, means for driving said chains in unison and wire-cutting means forming a component part of said chains, said cutting means being constructed and arranged to be actuated at the point of exit of the stay wire from the chains, said cutting means being carried by one of the said chains and the length of the chain carrying said cutting means being such as to determine the length to which the stay wires are cut.

12. A machine as claimed in claim 8 comprising adjustment means for yieldably pressing side plies upon the wire.

13. A machine as claimed in claim 8 comprising means for exerting pressure upon the wire-gripping portions of the chains, said means comprising a fixed member adapted to engage rollers on one of the chains, a movable member adapted to engage rollers on the other chain, and springs adapted to press said movable member towards the adjacent rollers on one of the chains.

14. A machine as claimed in claim 8 comprising a flying cutter carried by one of the links of one of the chains and adapted to cut the wire during feeding movement of the latter, said cutter being slidable within its carrying link in a direction transverse to the wire and a sprocket wheel being provided intermeshing with this chain and adapted to actuate said cutter.

15. A machine as claimed in claim 8 comprising means for exerting pressure upon the wire-gripping portions of the chains, said means comprising a fixed member adapted to engage rollers on one of the chains, a movable member adapted to engage rollers on the other chain, and springs adapted to press said movable member towards the adjacent rollers on one of the chains, pivoted levers carrying said movable member and resilient means operatively connected with said levers which causes the movable member to exert pressure upon its wire-feeding member.

16. A machine as claimed in claim 1 comprising means adapted to operate upon the line wires as they are fed through the machine so as to impart a helical form to these wires.

17. A machine as claimed in claim 1 comprising means adapted to operate upon the line wires as they are fed through the machine so as to impart a helical form to these wires, said means comprising a series of rollers which are arranged in staggered relationship and means being provided whereby the angular position of these rollers relatively to each other may be varied.

18. In a machine for forming wire fabric, the combination of means for feeding line wires therethrough, means for feeding stay wires across the line wires, means for feeding wire to the machine from which wire-locks may be formed at the intersection of a stay wire with the line wires, means embodied in the machine for forming said wire-locks and to which means the stay wires are fed directly and means for forming staples and for thereafter feeding the staples into a position where they straddle the stay wires at the points of intersection of these wires with the line wires, said means for forming the wire-locks comprising dies which latter operate to produce the finished locks by forming said staples around the intersecting wires.

19. A machine as claimed in claim 1 comprising means for twisting the ends of the stay wires around the marginal line wires, and means for feeding the stay wires across the line wires, said latter means being operated to feed the said wires by said former means.

20. In a machine for forming wire fabric, the combination of means for feeding line wires therethrough, means for feeding stay wires across the line wires, means for forming wire-locks at the intersection of the stay wires with the line wires and to which latter means the stay wires are fed in a direction longitudinally of the stay wires said wire-locks being formed as closed loops engaging the stay and line wires on each side of the point of intersection of those wires.

21. In a machine for forming wire fabric, the combination of wires for feeding line wires therethrough, means for feeding stay wires across the line wires, means for forming wire-locks at the intersection of the line and stay wires to which latter means the said wires are fed directly, said latter means comprising dies in which the locks are formed, means for forming a plurality of staples and for thereafter feeding the staples into a position where they straddle the stay wires at the points of intersection of these wires with the line wires, said staples being fed into the said dies which complete the formation of the wire-locks, and said means for forming the staples comprising a slide and a movable anvil around which the staple is formed and another slide adapted to be brought into operation when a staple has been formed so as to force the staple into the said dies, and draw bars disposed crosswise of and at either side of the plane of the fabric, which draw bars operate the said dies and the said staple forming slides, including the slides which drive the staples into the dies.

22. In a machine for forming wire fabric, the combination of means for feeding line wires therethrough, means for feeding stay wires across the line wires, means for forming wire-locks at the intersection of the line and stay wires to which latter means the stay wires are fed directly, said means for forming the wire-locks comprising dies constituted by fixed and movable parts, the wire-locks being formed in the closed position of the die parts, said stay wire being fed longitudinally of itself in a line between the intermediate line wires and the fixed die parts when the die parts are in open position.

23. In a machine for forming wire fabric, the combination of means for feeding line wires therethrough, means for feeding stay wires across the line wires longitudinally of the stay wire in a line running between the marginal line wires and the intermediate line wires of the fabric and dies for forming the wire-locks at the intersection of the stay wires with the intermediate line wires, said stay wires being fed directly to said dies, said wire-locks being formed as closed loops engaging the stay and line wires on each side of the point of intersection of those wires.

24. In a machine for forming wire fabric, the combination of means for feeding line wires therethrough, dies for forming wire-locks at the intersection of the stay wires of the fabric with the intermediate line wires, said dies being adapted to be closed and opened, and means for feeding each stay wire in a line coincident with the centre horizontal plane of the dies when open, said wire-locks being formed as closed loops engaging the stay and line wires on each side of the point of intersection of those wires and said stay wires being fed between the marginal line wires and the intermediate line wires.

25. In a machine for forming wire fabric, the combination of means for feeding line wires therethrough, means for feeding stay wires across the line wires, means for forming wire-locks at the intersection of the line and stay wires to which latter means the stay wires are fed directly, means for severing the stay wire lengths from a continuous wire line, and means adapted to receive and enclose the severed stay wires, said latter means comprising a guide which is arranged to reverse the direction of feed of a stay wire after same leaves feeding mechanism therefor, said guide having a bend therein in which the direction of feed of the wire is reversed.

26. A machine as claimed in claim 25 wherein said guide and the stay wire feeding and severing mechanism are adapted and arranged so that the operation of those parts of the apparatus including feeding of the severed stay wires transversely between dies in which the wire locks are formed, takes place within the normal width of the machine.

27. In a machine for forming wire fabric, the combination of means for feeding line wires therethrough, means for feeding stay wires across the line wires, means for forming wire-locks at the intersection of the line and stay wires, by which means the stay wires are fed in a direction longitudinally of the wires, said means for forming the wire-locks comprising dies constituted by fixed and movable parts, the dies being thus adapted to be opened and closed and the wire-locks being formed in the closed position of the dies, guides for supporting and directing the portions of the stay wires between the said dies, said guides being adapted to be operated so as to permit of the stay wires being moved into operative position between the dies for the formation of wire-locks and also permit feeding of the fabric after successive forming operations, and said guides comprising fixed and movable parts, said movable guide parts being arranged to be opened simultaneously upon contact of a stay wire with the line wires when the latter are pushed forward by the said movable die parts as the latter parts are being closed against their complementary fixed parts.

28. A machine as claimed in claim 27 wherein said movable guide parts are initially open only sufficient to permit the direct passage of a stay wire as the latter is carried by the movable die parts acting against the line wires from its feeding line to its position where the wire-locks are applied, the said guide parts being thereafter opened fully so as to leave a clear passage for the fabric which leaves the dies.

29. A machine as claimed in claim 27 wherein closing of the movable die parts acting against the line wires is the sole means for moving the stay wires from their initial position between the die parts to their locking position in which the wire-locks are applied.

30. In a machine for forming wire fabric, the combination of means for feeding line wires therethrough, means for feeding stay wires across the line wires, means for forming wire-locks at the intersection of the line and stay wires, the latter being fed in a direction longitudinally thereof to the said means for forming the wire-locks, and means for twisting the ends of the stay wires around the marginal line wires, said latter means comprising in combination a margin twister spindle and stay wire feeding rollers rotatable thereby, one of the rollers being also movable to or from the line of feed of the stay wire between the dies, and a spring being provided for urging the movement of said rollers towards said line, means being also provided for controlling the line of and limiting the movement of said roller.

31. In a machine for forming wire fabric, the combination of means for feeding line wires therethrough, means for feeding stay wires across the line wires, means for forming wire-locks at the intersection of the line and stay wires, to which latter means the stay wires are fed directly and in a direction longitudinally of the wires, and means whereby a plurality of separate widths of fabric may be produced in the same machine simultaneously, the stay wires for the separate lengths of fabric being formed from a single piece of wire which is severed while it is located between said means for forming the wire-locks, said means being provided for forming the wire-locks for each length of fabric simultaneously.

32. In a machine for producing wire fabric, the combination of means for feeding line wires therethrough, means for feeding a piece of wire longitudinally of itself for forming wire-locks at the intersection of the latter piece of wire with the line wires, to which wire-lock forming means the said piece of wire is fed directly, and means for severing said piece of wire at an intermediate point thereof so as to form therefrom separate pieces of wire which may constitute the stay wires of a plurality of separate pieces of fabric produced by the same machine simultaneously.

33. In a machine for forming wire fabric, the combination of means for feeding line wires therethrough, means for forming the wire-locks of the fabric, means for feeding a piece of wire longitudinally of itself between the parts of the said dies, means for severing said wire while same is located between said parts of the dies and means for twisting the ends of the severed piece of said wire around adjacent line wires arranged in the machine, said severed pieces of wire and the said adjacent line wires constituting respectively the stay wires and the marginal line wires of separate pieces of fabric produced simultaneously by the same machine.

34. A machine as claimed in claim 31 comprising mechanism for twisting the two ends of the stay wires for each separate piece of fabric around the marginal wires of the latter, the first bend in twisting each of said ends of wire being made towards that side of the plane of the fabric on which the staples for the wire-locks are formed and driven into the dies for forming the wire-locks.

35. In a machine for forming wire fabric, the combination of means for feeding line wires therethrough, means for feeding stay wires across the line wires, means for forming wire-locks at the intersection of the line and stay wires, to which latter means the stay wires are fed in a direction longitudinally thereof, means for twisting the ends of the stay wires around the marginal line wires of the fabric and means adapted to be operated at appropriate moments so as to deflect the ends of the stay wire into the path of said twisting means, said deflecting means comprising a reciprocatory member, which latter is provided with a bevelled surface which is moved at the appropriate moment into the path of the stay wire so as to deflect the latter into the path of a constantly rotating twisting hook provided on the said twisting means.

36. A machine as claimed in claim 33 comprising in combination therewith a pair of twisters for twisting the severed ends of the said piece of wire, a cutter located between said twisters adapted to sever said wire in advance of the action of the said twisters on the latter, a toothed slide arranged to be moved in a plane substantially at right angles to the plane of the fabric produced by the machine, said toothed slide being moved by means of a toothed bar which is preferably arranged substantially at right angles to the slide, the latter carrying fingers for depressing the severed ends of the said wire into the path of the constantly rotating hooks on the said twisters, which hooks perform the actual twisting of the ends of said wire around the adjacent marginal wires.

37. A machine as claimed in claim 33 comprising in combination therewith a pair of twisters for twisting the severed ends of the said piece of wire, a cutter located between said twisters adapted to sever said wire in advance of the action of the said twisters on the latter, a toothed slide arranged to be moved in a plane substantially at right angles to the plane of the fabric produced by the machine, said toothed slide being moved by means of a toothed bar which is preferably arranged substantially at right angles to the slide, the latter carrying fingers for depressing the severed ends of the said wire into the path of hooks on the said twisters, which hooks perform the actual twisting of the ends of said wire around the adjacent marginal wires, and means carried by said slide for operating the cutter for severing said wire.

38. A machine as claimed in claim 33 wherein the means for severing said piece of wire comprising a fixed and a movable part, the said fixed part of the cutting mechanism being supported in a position below the line of feed of the stay wire between the die parts and the movable part of the cutting mechanism being supported in a position above said line of feed.

39. A machine as claimed in claim 33 embodying cutting mechanism for severing the stay wires for the separate pieces of fabric, said cutting mechanism comprising a fixed and a movable part, said movable part being adapted to move the said piece of wire from the position into which it is initially fed longitudinally of itself into the cutting position, the severed ends of the wire being engaged by the twisters in such position and twisted around the adjacent marginal wires.

40. In a machine for forming wire fabric the combination of means for feeding line wires therethrough, dies in which the wire-locks for connecting the intermediate line wires with the stay wires are formed, mechanism for twisting the ends of a stay wire around the marginal line wires, a cutter for severing said stay wire at a point intermediate of its ends so that a plurality of separate pieces of fabric may be produced by the same machine simultaneously, the severed pieces of said wire constituting the stay wires of the separate pieces of fabric, mechanism for twisting said severed ends of said wire around the adjacent line wires, the latter constituting the other marginal line wires of the separate pieces of fabric, said mechanism for twisting the severed ends of the said stay wire comprising in combination a pair of twister blocks having slideways formed therein for fingers and for a toothed slide between them, a cutter therefor having a downward extension radially supporting a fixed cutter in a position below the feed line of the stay and a pivoted cutter above said line, and a downward opening to carry the wire when moved by the pivoted cutter direct to position for cutting and whereby the two ends so formed lie at the right moment in position to be taken up by hooks on the twisters and twisted around the marginal line wires.

41. In a machine for forming wire fabric, the combination of means for feeding line wires therethrough, means for feeding stay wires across the line wires, dies in which wire-locks are formed at the intersection of the line and stay wires, said dies having fixed and movable parts, means above the fixed parts of the dies arranged to intersect the plane of the fabric and having a cam surface which overlies the locking position of the stay wires within the dies and serves to bear against the stay wires of the fabric as same are successively moved away from the dies, said cam surface causing the fabric to be moved away from the fixed die parts to a position beyond and clear of the feed line of the next succeeding stay wire.

42. A machine as claimed in claim 1 comprising mechanism for twisting the two ends of the stay wires around the marginal line wires, said means comprising a rotatable spindle having a hook thereon which engages the end of a stay wire and operates to twist the same around the adjacent marginal wire, said twisting hook having a dovetailed connection with the top of the twister spindle and said hook part a hole in line with a hole formed in said spindle for the passage of a marginal line wire and said dovetail extending radially to the periphery of the spindle head.

43. A machine as claimed in claim 1 comprising mechanism for twisting the two ends of the stay wires around the marginal line wires, said twisting mechanism comprising a constantly rotating rotatable spindle having a twisting hook carried thereon, gearing for driving the twister spindles and means for adjusting the angular position of the twisting hooks.

44. A machine as claimed in claim 35 wherein said reciprocatory member is provided with a slot which normally is in alignment with a downwardly inclined slot provided in a fixed part, a stay wire being initially passed through the aligned slots and subsequently, upon reciprocation of said member, being carried forward and downwardly in the slot formed in said fixed part so as bring the end of said stay wire into twisting position.

45. In a machine for forming wire fabric, the combination of means for feeding line wires therethrough, means for feeding stay wires across the line wires, means for forming wire-locks at the intersections of stay wires with the line wires and means for twisting the ends of the stay wires around the marginal line wires, said latter means comprising a rotatable spindle having a twisting hook carried thereon, gearing for rotating the spindles and means for adjusting the angular position of said twisting hooks, said latter means comprising a tapered sleeve upon which a part of said bearing is mounted and is capable of being set at any required position by the operation of adjusting means provided at one end of the said sleeve.

ARTHUR ERNEST BLASHILL.